(12) United States Patent
Kuwahara et al.

(10) Patent No.: US 12,343,626 B2
(45) Date of Patent: Jul. 1, 2025

(54) SYSTEM, METHOD, AND COMPUTER READABLE MEDIUM WITH PROGRAM FOR VIRTUAL CAMERA PLACEMENT IN A VIRTUAL ENVIRONMENT

(71) Applicant: Nintendo Co., Ltd., Kyoto (JP)

(72) Inventors: Masato Kuwahara, Kyoto (JP); Kochi Kawai, Kyoto (JP); Tatsuya Ajimizu, Kyoto (JP); Shingo Horiguchi, Kyoto (JP); Keisuke Seko, Kyoto (JP); Yuriko Sakai, Kyoto (JP); Shinji Kurimoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 437 days.

(21) Appl. No.: 17/868,810

(22) Filed: Jul. 20, 2022

(65) Prior Publication Data
US 2022/0362667 A1 Nov. 17, 2022

Related U.S. Application Data

(63) Continuation of application No. PCT/JP2020/035539, filed on Sep. 18, 2020.

(30) Foreign Application Priority Data

Jan. 28, 2020 (JP) ................................. 2020-011691

(51) Int. Cl.
*A63F 13/5252* (2014.01)
*G02B 27/01* (2006.01)

(52) U.S. Cl.
CPC ........ *A63F 13/5252* (2014.09); *G02B 27/017* (2013.01); *G02B 2027/0138* (2013.01); *G02B 2027/014* (2013.01)

(58) Field of Classification Search
CPC .................................................. A63F 13/5252
See application file for complete search history.

(56) References Cited

U.S. PATENT DOCUMENTS 9,849,384 B1 * 12/2017 Energin ............. H04N 21/6587
9,914,056 B2 * 3/2018 Amano ................. A63F 13/525
(Continued)

FOREIGN PATENT DOCUMENTS

JP 2013-61870 A 4/2013
JP 2019-74362 A 5/2019
(Continued)

OTHER PUBLICATIONS

International Search Report and Written Opinion mailed on Dec. 8, 2020, received for PCT Application PCT/JP2020/035539, filed on Sep. 18, 2020, 8 pages including English Translation.

*Primary Examiner* — Corbett B Coburn
(74) *Attorney, Agent, or Firm* — Nixon & Vanderhye PC

(57) ABSTRACT

An example of an image processing system includes a first HMD worn by a first user and a smart device carried by a second user. In a virtual space, a second virtual camera and a second object are placed in accordance with a position of the smart device relative to a reference in a real space. In the virtual space, a first object is placed regardless of a position of the first HMD in the real space, and a first virtual camera is placed at a position relating to a position of the first object. An image of the virtual space including the second object is displayed on the first HMD based on the first virtual camera. An image of the virtual space including the first object is displayed on the smart device based on the second virtual camera.

16 Claims, 21 Drawing Sheets

(56) References Cited

U.S. PATENT DOCUMENTS

| | | | | |
|---|---|---|---|---|
| 2003/0107647 | A1* | 6/2003 | James | H04N 7/18 |
| | | | | 382/104 |
| 2013/0322844 | A1* | 12/2013 | Suzuki | G06T 19/006 |
| | | | | 386/230 |
| 2014/0218291 | A1* | 8/2014 | Kirk | G06T 7/70 |
| | | | | 345/158 |
| 2015/0130790 | A1* | 5/2015 | Vasquez, II | G06T 19/006 |
| | | | | 345/419 |
| 2016/0327950 | A1* | 11/2016 | Bachrach | G05D 1/0094 |
| 2017/0024934 | A1 | 1/2017 | Numaguchi et al. | |
| 2017/0266554 | A1* | 9/2017 | Marks | A63F 13/5255 |
| 2017/0269685 | A1* | 9/2017 | Marks | A63F 13/212 |
| 2019/0102941 | A1* | 4/2019 | Khan | G02B 27/017 |
| 2019/0116350 | A1 | 4/2019 | Goto et al. | |
| 2019/0217202 | A1* | 7/2019 | Komori | A63F 13/216 |
| 2019/0220089 | A1* | 7/2019 | Kakizawa | A63F 13/807 |
| 2019/0333261 | A1 | 10/2019 | Nakashima | |
| 2020/0289934 | A1* | 9/2020 | Azmandian | G06F 3/012 |
| 2020/0294320 | A1* | 9/2020 | Ogura | G06T 19/20 |
| 2020/0298114 | A1* | 9/2020 | Onozawa | H04N 13/344 |
| 2020/0304770 | A1* | 9/2020 | Iwata | H04N 13/275 |
| 2022/0008820 | A1* | 1/2022 | Konishi | A63F 13/211 |
| 2023/0280742 | A1* | 9/2023 | Bachrach | G05D 1/0094 |
| | | | | 701/2 |

FOREIGN PATENT DOCUMENTS

| | | |
|---|---|---|
| JP | 2019-516159 A | 6/2019 |
| JP | 2019-518261 A | 6/2019 |
| JP | 2019-192173 A | 10/2019 |
| WO | 2015/159561 | 10/2015 |
| WO | 2018/064601 | 4/2018 |

* cited by examiner

F I G. 7
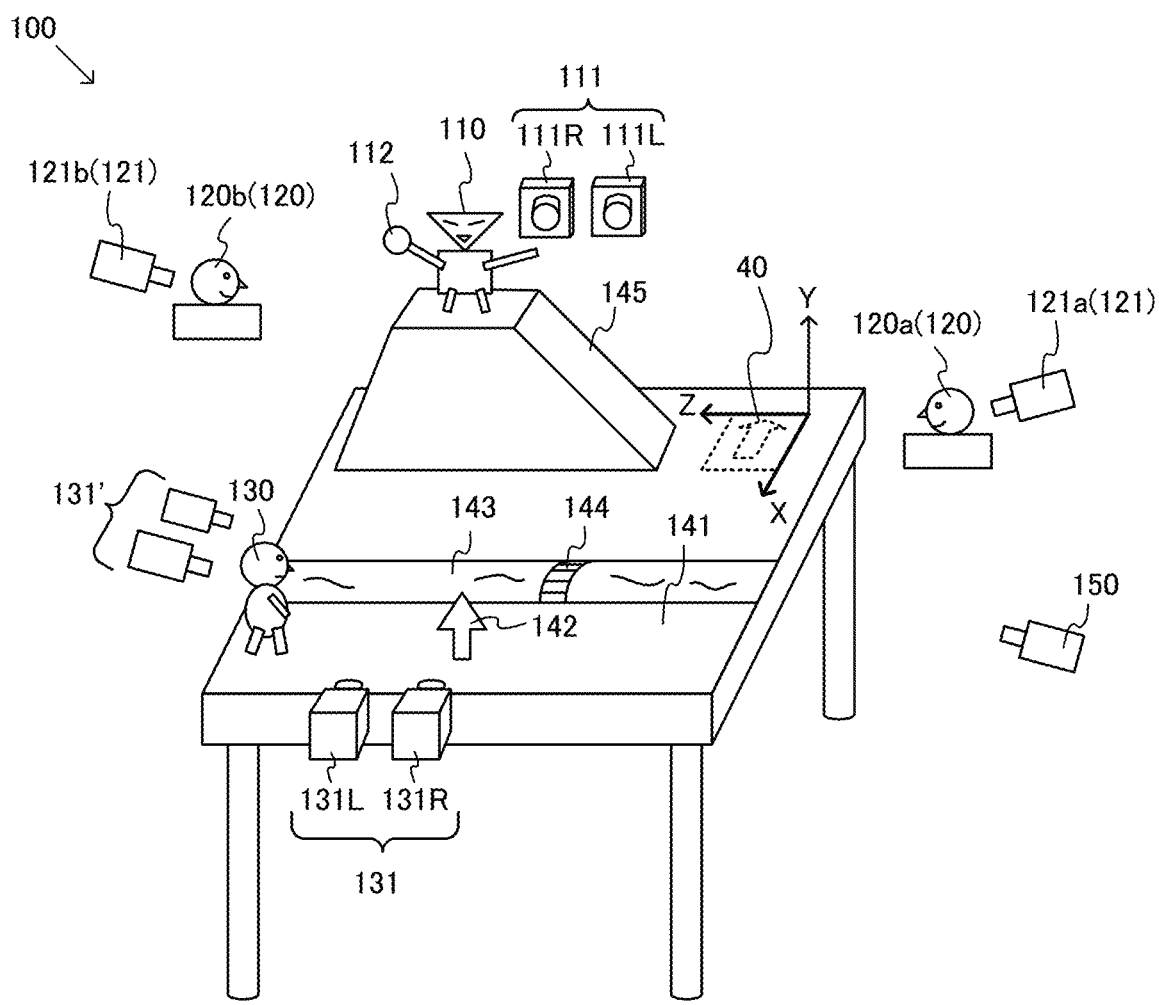

SYSTEM, METHOD, AND COMPUTER READABLE MEDIUM WITH PROGRAM FOR VIRTUAL CAMERA PLACEMENT IN A VIRTUAL ENVIRONMENT

CROSS-REFERENCE TO RELATED APPLICATIONS

This application is a continuation of International Patent Application No. PCT/JP2020/035539 filed on Sep. 18, 2020 which claims priority to Japanese Patent Application No. 2020-011691 filed on Jan. 28, 2020, the entire contents of each are incorporated herein by reference.

FIELD

An exemplary embodiment relates to an image processing system, a non-transitory computer-readable storage medium having stored therein an image processing program, and an image processing method that are capable of displaying images on a plurality of displays.

BACKGROUND AND SUMMARY

As a background art, there is a system that places a virtual object in a virtual space and displays an image of the virtual space including the virtual object on a display.

However, there is room for improvement in view of an increase in usability regarding the display of an image of a virtual space.

Therefore, it is an object of an exemplary embodiment to provide an image processing system, a non-transitory computer-readable storage medium having stored therein an image processing program, and an image processing method that are capable of increasing usability regarding the display of an image of a virtual space.

To achieve the above object, the exemplary embodiment employs the following configurations.

An image processing system according to the exemplary embodiment includes a first display that can be viewed by a first user, a first input device configured to receive an input from the first user, a portable second display that is carried by a second user and can be viewed by the second user, and at least one processor. The at least one processor is configured to: place a first object in a virtual space, regardless of positions in a real space of the first display and the first user; control the first object in accordance with the input received by the first input device; place a first virtual camera at a position relating to a position of the first object in the virtual space; place a second virtual camera at a first position in the virtual space set in accordance with a position of the second display relative to a reference in the real space and set an orientation of the second virtual camera to a first orientation relating to an orientation of the second display in the real space; place a second object at a second position in the virtual space set in accordance with the position of the second display relative to the reference in the real space; display an image of the virtual space including the second object on the first display, the image generated based on the first virtual camera; and display an image of the virtual space including the first object on the second display, the image generated based on the second virtual camera.

The second position may be the same position as or a different position from the first position. "A position relating to a position of the first object" may be the same position as the position of the first object, or may be a different position from the position of the first object.

Based on the above, a first object is set in a virtual space regardless of the position of a first display in a real space, and a second object is set in the virtual space in accordance with the position of a second display relative to a reference in the real space. A first virtual camera is placed at a position in the virtual space relating to the position of the first object. A second virtual camera is placed in the virtual space in accordance with the position of the second display relative to the reference in the real space, and the orientation of the second virtual camera is set in accordance with the orientation of the second display. Then, on the first display, an image of the virtual space including the second object is displayed based on the first virtual camera. On the second display, an image of the virtual space including the first object is displayed based on the second virtual camera. Consequently, on the first display, an image viewed from a position relating to the position of the first object in the virtual space can be displayed. On the second display, an image of the virtual space viewed from a position in the virtual space relating to the position of the second display relative to the reference in the real space can be displayed. Thus, a first user and a second user can view the virtual space from different points of view. The position of the second object is set in the virtual space in conjunction with the position of the second display in the real space. Thus, the first user views the second object in the virtual space and thereby can grasp the position of the second user in the real space. The second user can view the first object in the virtual space in accordance with the position or the orientation of the second display in the real space.

Further, the image processing system may further include a second input device configured to receive an input from the second user. The at least one processor may be configured to influence the virtual space or the first object in accordance with the input received by the second input device.

Based on the above, it is possible to influence the virtual space or the first object based on an input from the second user.

Further, in accordance with the input received by the second input device, a third object may appear in the virtual space. An image including the second object and the third object may be displayed on the first display. An image including the first object and the third object may be displayed on the second display.

Based on the above, in accordance with the input from the second user, it is possible to cause a predetermined object to appear in the virtual space and display the predetermined object on the first display and the second display.

Further, the first object may be changed using the third object.

Based on the above, it is possible to cause the predetermined object to appear in accordance with the input from the second user and change the first object using the predetermined object.

Further, the at least one processor may be configured to control a game using the first object. The third object may be an object advantageous or disadvantageous in the game for the first object.

Based on the above, it is possible to perform a game using the first object controlled by the first user, and it is possible to cause a predetermined object advantageous or disadvantageous in the game for the first object to appear in the virtual space in accordance with the input from the second user. Consequently, the second user can participate in the game performed by the first user.

Further, the first display may be a head-mounted display. The second display may include a camera configured to capture the real space in a back surface direction. The at least one processor may detect a marker placed in the real space as the reference based on an image from the camera and places the second virtual camera at the first position relating to a position of the second display relative to the marker. The at least one processor may display on the second display an image obtained by superimposing the image of the virtual space generated based on the second virtual camera on an image of the real space captured by the camera.

Based on the above, while the first user can view the virtual space wearing a head-mounted display, the second user can capture a marker in the real space, view the virtual space from a position relating to the position of the second display relative to the marker, and view an image of the virtual space in a superimposed manner on an image of the real space. The second user moves or changes their direction in the real space and thereby can view the virtual space from various points of view in the virtual space and view the virtual space viewed by the first user as if the real space.

Further, the image processing system may further include a controller held by the first user or the second user. The first display or the second display may be a head-mounted display. The image processing system may further include a camera capable of capturing a hand of the first user or the second user wearing the head-mounted display. The at least one processor may be configured to: detect the hand of the first user or the second user or the controller based on an input image from the camera, place a virtual controller object representing the controller at a position of the hand, and further place, at a predetermined position in the controller object, an indication object for indicating a position in the virtual space; and display an image including the controller object and the indication object on the head-mounted display.

Based on the above, a virtual controller object representing a controller is placed at the position of a hand. Thus, even if a user wears a head-mounted display, the user can easily perform an operation using the controller while viewing the controller object. An indication object is provided at a predetermined position in the controller object, and therefore, it is possible to accurately indicate a position in the virtual space while viewing the indication object, and it is possible to increase operability.

Further, the image processing system may further include a camera configured to capture the real space. The at least one processor may be configured to: detect a particular object present in the real space based on an input image from the camera and place a virtual object relating to the particular object at a position in the virtual space relating to at a position of the particular object in the real space; and display an image of the virtual space including the virtual object on the first display.

Based on the above, it is possible to cause a virtual object relating to an actual object present in the real space to appear in the virtual space, and it is possible to display the virtual object on the first display.

Further, the image of the virtual space including the virtual object may be displayed on the second display.

Based on the above, it is also possible to display a virtual object relating to an actual object on the second display.

Further, the at least one processor may, after the virtual object is placed due to detection of the particular object, and if the particular object is not detected based on the input image from the camera, cause the virtual object to continue to be present in the virtual space, and even if the particular object is not detected based on the input image from the camera, display the image of the virtual space including the virtual object on the first display.

Based on the above, after a virtual object is placed in the virtual space by a camera detecting a particular object in the real space, and for example, even if the particular object ceases to be detected due to the movement of the camera or a change in the direction of the camera, it is possible to cause the virtual object to continue to be present in the virtual space.

Further, the first display may be a head-mounted display. The at least one processor may be configured to: determine whether or not the first user comes out of a range in the real space, and if it is determined that the first user comes out of the range, give a notification to the first user; and determine whether or not the second user enters the range, and if it is determined that the second user enters the range, give a notification to the second user.

Based on the above, if the first user comes out of a predetermined range or the second user enters the predetermined range, it is possible to give a notification to the first user and the second user.

Further, the first input device may be a controller to which a key input can be provided. The at least one processor may control the position or an orientation of the first object in accordance with the key input to the first input device.

Based on the above, the first user can control the first object by providing a key input.

Further, the first virtual camera may be placed at the position of the first object.

Based on the above, it is possible to display on the first display an image of the virtual space viewed from the first object.

Further, the first virtual camera may be placed to include the first object in an image capturing range of the first virtual camera at a position a distance away from the position of the first object.

Based on the above, it is possible to display on the first display an image of the virtual space including the first object from a position a predetermined position away from the first object.

Another exemplary embodiment may be a program executed by one or more computers included in the above image processing system. Another exemplary embodiment may be an image processing method performed by the above image processing system.

According to the exemplary embodiment, it is possible to display on a first display an image viewed from a position relating to the position of a first object in a virtual space, and it is possible to display on a second display an image of the virtual space viewed from a position relating to the position of a second display relative to a reference in a real space.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 7 is an example non-limiting diagram showing an example of a virtual space 100 including a plurality of virtual objects;

FIG. 15 is an example non-limiting diagram showing an example of the state where a character 120a discharges a bullet object 122 in accordance with an operation on the smart device 20a;

DETAILED DESCRIPTION OF NON-LIMITING EXAMPLE EMBODIMENTS (Configuration of Image Processing System)

An image processing system 1 according to an exemplary embodiment is a system that causes a plurality of users to view images of the same virtual space, and for example, is a system for a plurality of users to perform a game. With reference to the drawings, the image processing system 1 according to the exemplary embodiment is described below.

Figure 1:
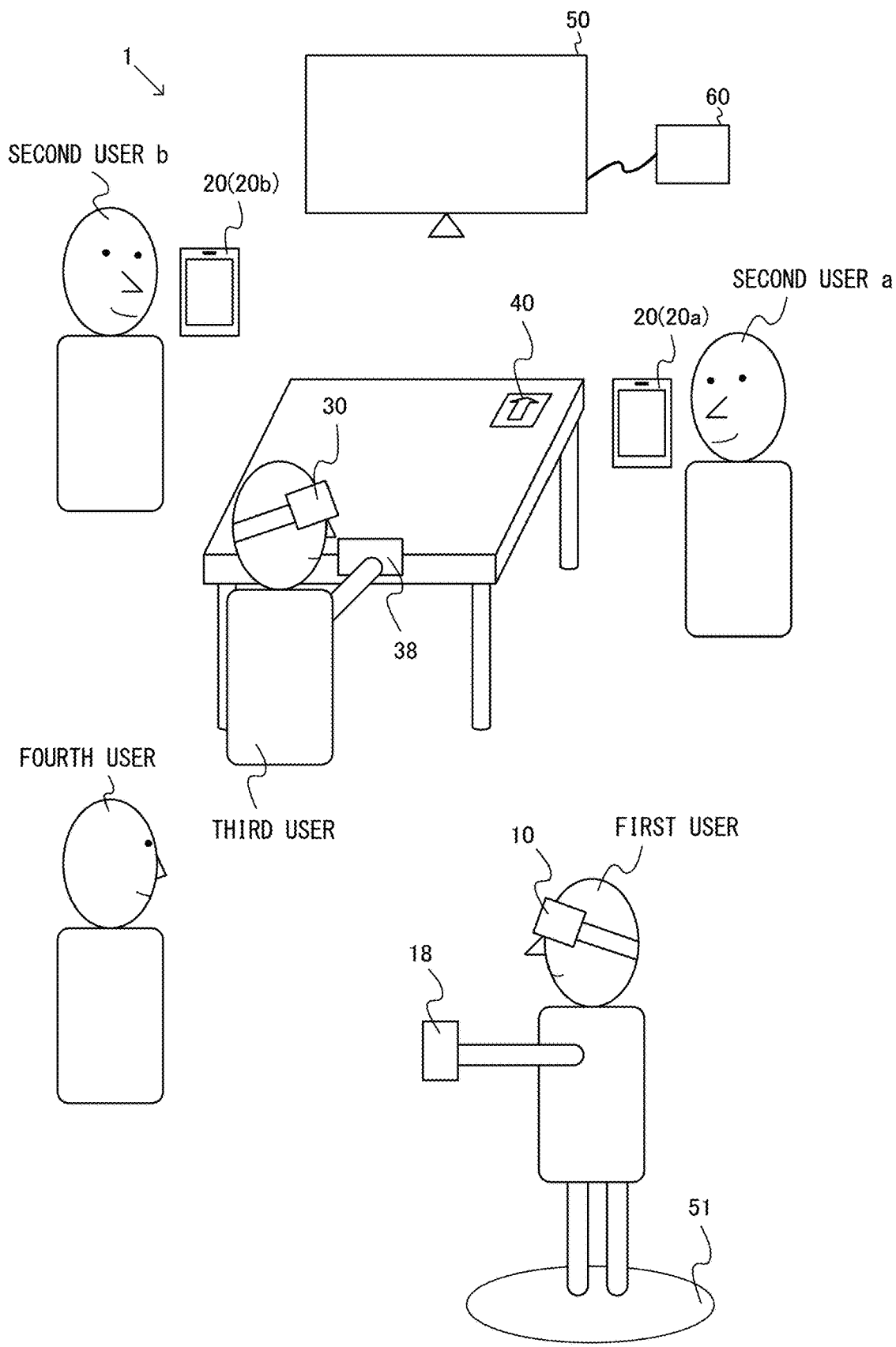
FIG. 1 is an example non-limiting diagram showing an example of the state where images of a virtual space are viewed by a plurality of users using an image processing system 1 according to an exemplary embodiment.
Figure 2:
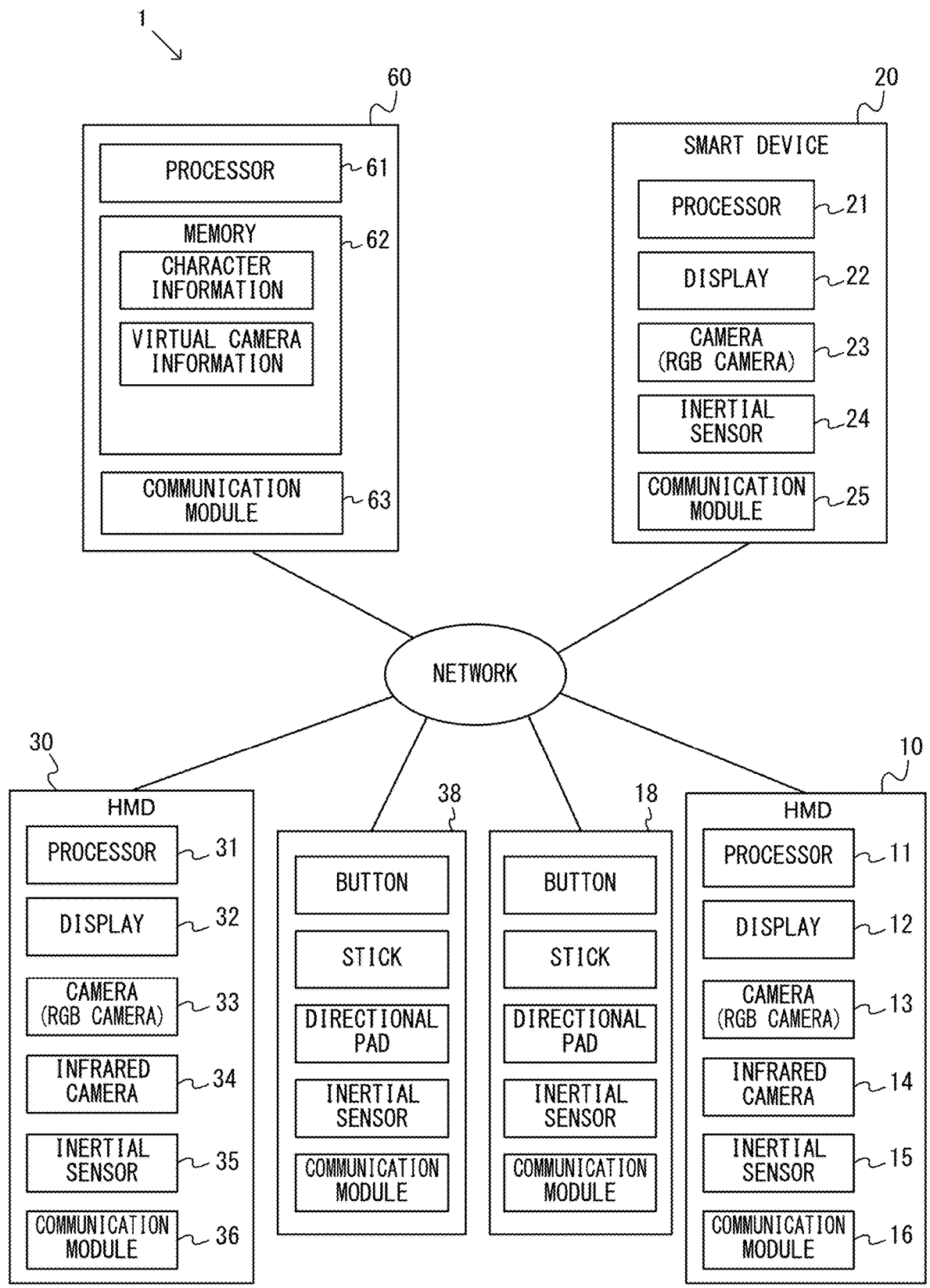
FIG. 2 is an example non-limiting diagram showing an example of the overall configuration of the image processing system 1.
Figure 3:
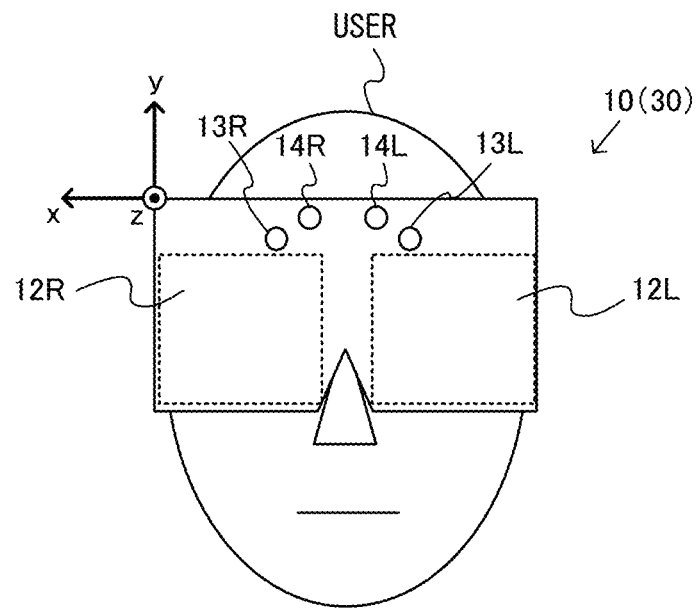
FIG. 3 is an example non-limiting diagram showing an example of the configuration of a first HMD 10 (or a second HMD 30) included in the image processing system 1.
Figure 4:
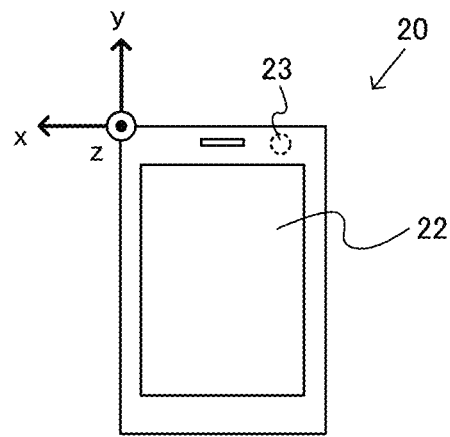
FIG. 4 is an example non-limiting diagram showing an example of the configuration of a smart device 20 included in the image processing system 1.
Figure 5:
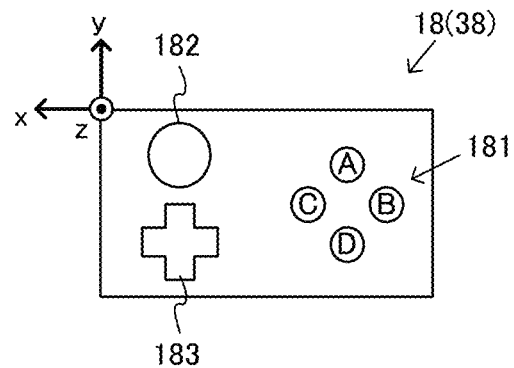
FIG. 5 is an example non-limiting diagram showing an example of the configuration of a controller 18 included in the image processing system 1.

FIG. 1 is a diagram showing an example of the state where images of a virtual space are viewed by a plurality of users using the image processing system 1 according to the exemplary embodiment. FIG. 2 is a diagram showing an example of the overall configuration of the image processing system 1. FIG. 3 is a diagram showing an example of the configuration of a first HMD 10 (or a second HMD 30) included in the image processing system 1. FIG. 4 is a diagram showing an example of the configuration of a smart device 20 included in the image processing system 1. FIG. 5 is a diagram showing an example of the configuration of a controller 18 included in the image processing system 1.

As shown in FIG. 1, the image processing system 1 includes a first head-mounted display 10 (hereinafter referred to as a "first HMD") worn by a first user and a second head-mounted display 30 (hereinafter referred to as a "second HMD") worn by a third user.

The first HMD 10 is attached to the head of the first user by covering both eyes of the first user. The second HMD 30 is attached to the head of the third user by covering both eyes of the third user. The first HMD 10 and the second HMD 30 are apparatuses having basically the same configurations. With reference to FIG. 3, examples of the configurations of the first HMD 10 and the second HMD 30 are described below.

As shown in FIG. 3, the first HMD 10 includes a right-eye display 12R and a left-eye display 12L. The right-eye display 12R is viewed by the right eye of the user through a lens (not shown) in a case where the user wears the first HMD 10. The left-eye display 12L is viewed by the left eye of the user through a lens (not shown) in a case where the user wears the first HMD 10. As each of the right-eye display 12R and the left-eye display 12L, any display device may be used. For example, a liquid crystal display device or an organic EL display device may be used. In a case where the user wears the first HMD 10, the right eye and the left eye of the first user are covered by the right-eye display 12R and the left-eye display 12L, respectively, and the field of view of the first user is almost covered by the displays 12. Thus, in a case where the first user wears the first HMD 10, the first user views only images displayed on the displays 12 without viewing a real space.

The displays 12 may be transmissive displays. In this case, the first user can view the real space through the displays 12 and also view images displayed on the displays 12.

On a front surface of the first HMD 10, a right camera 13R located on the right side as viewed from the user and a left camera 13L located on the left side as viewed from the user are provided. The right camera 13R and the left camera 13L are cameras for receiving visible light and generating images (RGB images). Hereinafter, the right camera 13R and the left camera 13L will occasionally be referred to collectively as a "camera 13".

On the front surface of the first HMD 10, a right infrared camera 14R located on the right side as viewed from the user and a left infrared camera 14L located on the left side as viewed from the user are provided. The right infrared camera 14R and the left infrared camera 14L are cameras for receiving infrared light and generating infrared images. Although the details will be described below, the right infrared camera 14R and the left infrared camera 14L are used to detect the hands of the user. Hereinafter, the right infrared camera 14R and the left infrared camera 14L will occasionally be referred to collectively as an "infrared camera 14".

In the first HMD 10, an x-axis that is an axis in a right direction of the first HMD 10, a y-axis that is an axis in an up direction of the first HMD 10, and a z-axis that is an axis in a front direction of the first HMD 10 are set. The first HMD 10 includes an inertial sensor 15 (see FIG. 2) that detects accelerations and angular velocities with respect to the x-axis, y-axis, and z-axis directions. Based on the accelerations and the angular velocities detected by the inertial sensor 15, the orientation of the first HMD 10 can be calculated.

The first HMD 10 also includes a communication module 16 for connecting to a network (a LAN, a WAN, the Internet, or the like) (see FIG. 2).

The second HMD 30 also has a configuration similar to that of the first HMD 10. Specifically, the second HMD 30 includes left and right displays 32 (32L and 32R), left and right cameras 33 (33L and 33R), and left and right infrared cameras 34 (34L and 34R) (see FIG. 2). The second HMD 30 also includes an inertial sensor 35 that detects accelerations and angular velocities with respect to x-axis, y-axis, and z-axis directions, and a communication module 36 (see FIG. 2). Hereinafter, the first HMD 10 and the second HMD 30 will occasionally be referred to collectively as an "HMD".

As shown in FIG. 1, the image processing system 1 also includes a smart device 20 carried by a second user. A plurality of second users may be present. Here, the second user includes a second user a and a second user b. The second user a holds a smart device 20a, and the second user b holds a smart device 20b. Hereinafter, in a case where the smart devices 20a and 20b are not distinguished from each other, the smart devices 20a and 20b will be referred to as the "smart device 20".

The smart device 20 is, for example, a smartphone, a tablet terminal, or the like. As shown in FIG. 4, on a front surface of the smart device 20, a display 22 is provided. The display 22 is, for example, a liquid crystal display device or an organic EL display device. On a back surface (a surface on the opposite side of the display 22) of the smart device 20, a camera 23 is provided. The camera 23 is a camera for receiving visible light and generating an RGB image. Cameras 23 may be provided at a plurality of places including a surface different from the back surface.

In the smart device 20, an x-axis that is an axis in a right direction of the smart device 20, a y-axis that is an axis in an up direction, and a z-axis that is an axis in a front direction are set. The smart device 20 includes an inertial sensor 24 (see FIG. 2) that detects accelerations and angular velocities with respect to the x-axis, y-axis, and z-axis directions. Based on the accelerations and the angular velocities detected by the inertial sensor 24, the smart device 20 can calculate the orientation of the smart device 20. The smart device 20 also includes a communication module 25 for connecting to the network (see FIG. 2).

The image processing system 1 also includes a controller 18 that is held by the first user and a controller 38 that is held by the third user. With reference to FIG. 5, an example of the configuration of the controller 18 is described.

As shown in FIG. 5, the controller 18 includes a plurality of buttons 181 (an A-button, a B-button, a C-button, and a D-button) that can be pressed by the user, an analog stick 182 for indicating a direction, and a directional pad 183 for indicating a direction. The controller 18 also includes an inertial sensor (see FIG. 2) that detects accelerations and angular velocities with respect to x-axis, y-axis, and z-axis directions shown in FIG. 5. Based on the accelerations and the angular velocities detected by the inertial sensor of the controller 18, the orientation or the motion of the controller 18 can be calculated. For example, based on the accelerations and the angular velocities from the inertial sensor, it can be determined whether or not the controller 18 is swung. The controller 18 also includes a communication module for connecting to the network (see FIG. 2). The controller 38 has basically the same configuration as that of the controller 18, and therefore is not described.

As shown in FIG. 1, the image processing system 1 also includes a marker 40, a display 50, and an information processing apparatus 60 connected to the display 50 in a wired or wireless manner.

The marker 40 is, for example, a card on which a predetermined image (e.g., an image of an arrow) is printed, and is placed on an upper surface of a table or the like. The display 50 is a stationary display device such as a television, and for example, may be a liquid crystal display device or an organic EL display device. The display 50 is a display device for a fourth user who does not carry the HMD (the first HMD 10 or the second HMD 30) or the smart device 20 to view an image of a virtual space.

As shown in FIG. 2, the information processing apparatus 60 includes one or more processors 61, a memory 62, and a communication module 63 for connecting to the network. The information processing apparatus 60 is an apparatus for controlling the entirety of a game according to the exemplary embodiment. The information processing apparatus 60 manages the positions or the orientations of various virtual objects in the virtual space and controls the virtual objects. Although the details will be described below, the memory 62 of the information processing apparatus 60 stores character information regarding each character placed in the virtual space. The character information includes information regarding the position or the orientation of the character. The information processing apparatus 60 also stores virtual camera information regarding the position or the orientation of each virtual camera.

Although the details will be described below, the information processing apparatus 60 generates an image of the virtual space to be displayed on the display 50 and outputs the generated image to the display 50. The information processing apparatus 60 also generates images of the virtual space to be displayed on the first HMD 10 and the second HMD 30 and transmits the generated images to the first HMD 10 and the second HMD 30 via the network. As the information processing apparatus 60, any information processing apparatus such as a personal computer, a game apparatus, a server apparatus, a smartphone, or a tablet terminal may be used. The information processing apparatus 60 may include a plurality of apparatuses, and may be formed by connecting a plurality of apparatuses via the network (the LAN, the WAN, the Internet, or the like).

In the exemplary embodiment, the first user to the fourth user are located at basically the same location (e.g., the same room), and the plurality of users perform the game using the image processing system 1. For example, the first user performs an operation for the game on a mat 51 placed at a position slightly away from the table. The first user performs a game operation by, for example, swinging the controller 18 while viewing images of the virtual space displayed on the left and right displays 12 of the first HMD 10. Specifically, on the right-eye display 12R of the first HMD 10, a right-eye virtual space image generated based on a right virtual camera placed in the virtual space is displayed. On the left-eye display 12L of the first HMD 10, a left-eye virtual space image generated based on a left virtual camera placed in the virtual space is displayed. Consequently, the first user can view a stereoscopic image of the virtual space and can experience virtual reality (VR) as if the first user were present in the virtual space.

The first user (the first HMD 10) can perform the game even if the first user is away from the table (the marker 40), regardless of their position relative to the marker 40 placed on the table. That is, even if the camera 13 of the first HMD 10 does not capture the marker 40, the first user can view the images of the virtual space.

The second user is located near the table, captures the marker 40 placed on the table using the camera 23 of the smart device 20, and performs the game while viewing an image displayed on the smart device 20. On (the display 22 of) the smart device 20, an image (hereinafter referred to as a "superimposed image") obtained by superimposing an image of the virtual space on an image of the real space captured by the camera 23 is displayed. Consequently, for example, the second user can have a feeling as if virtual objects in the virtual space were present in the real space, and can experience augmented reality (Augmented Reality: AR). Although the details will be described below, a coordinate system of the virtual space is defined based on the marker 40 in the real space, and the virtual space and the real space are associated with each other.

On the smart device 20, the superimposed image obtained by superimposing the image of the virtual space on the image of the real space does not necessarily need to be displayed, and only the image of the virtual space may be displayed. Even in a case where only the image of the virtual space is displayed on the smart device 20, the coordinate system of the virtual space is defined based on the marker 40 in the real space, and therefore, the virtual space and the real space are associated with each other. Thus, the second user can have a feeling as if virtual objects in the virtual space were present in the real space. That is, in augmented reality (AR) according to the exemplary embodiment, an image of the virtual space does not necessarily need to be displayed in a superimposed manner on an image of the real space so long as a reference in the real space and the virtual space are associated with each other, and only the image of the virtual space may be displayed on a display.

The third user is located near the table, captures the marker 40 using the cameras 33 of the second HMD 30, and performs the game by operating the controller 38 while viewing images of the virtual space displayed on the left and right displays 32 of the second HMD 30. Although the details will be described below, there is a case where the third user can perform the game even if the cameras 33 of the second HMD 30 cannot capture the marker 40.

The fourth user views an image of the virtual space displayed on the display 50, thereby watching the game performed by the first user to the third user.

(Definition of Coordinate System of Virtual Space Based on Marker 40)

Figure 6:
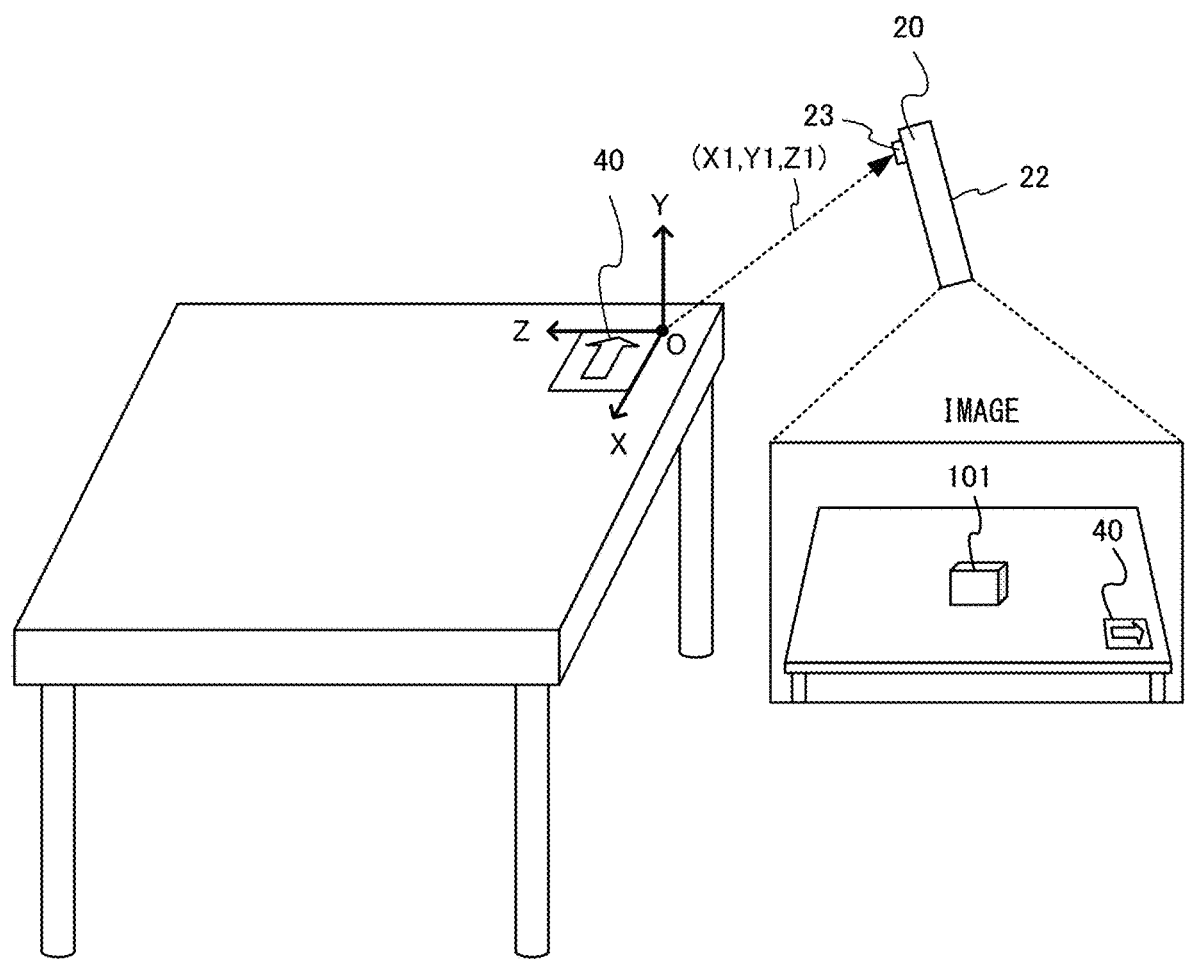
FIG. 6 is an example non-limiting diagram illustrating a coordinate system of the virtual space set by capturing a marker 40 using a camera 23 of the smart device 20.

Next, a description is given of the association between the real space and the virtual space by capturing the marker 40 using the cameras. FIG. 6 is a diagram illustrating the coordinate system of the virtual space set by capturing the marker 40 using the camera 23 of the smart device 20.

As shown in FIG. 6, if the real space is captured by the camera 23 of the smart device 20, an image including the marker 40 is acquired. The smart device 20 detects the marker 40 from the acquired image using various image recognition techniques. If the smart device 20 detects the marker 40 from the acquired image, the smart device 20 calculates the position of (the camera 23 of) the smart device 20 relative to the marker 40 in the real space based on the size, the shape, the direction, and the like of an image of the marker 40. For example, the smart device 20 sets an XYZ coordinate system where a predetermined vertex of the marker 40 is an origin O, a direction opposite to the direction of the arrow in the marker 40 is an X-axis, a direction perpendicular to the arrow is a Z-axis, and a direction perpendicular to the marker 40 (an up direction) is a Y-axis. The XYZ coordinate system is used as a coordinate system for defining a position in the virtual space. Based on the image of the marker 40 included in the image from the camera 23, the smart device 20 calculates the position of the smart device 20 relative to the marker 40 (the position relative to the marker) as coordinate values (X1, Y1, Z1) in the XYZ coordinate system. A virtual camera is placed at this position (X1, Y1, Z1) in the virtual space, whereby the position of the smart device 20 based on the marker 40 in the real space and the position of the virtual camera in the virtual space match each other. Then, for example, if a virtual object 101 is placed at a predetermined position on an XZ plane in the virtual space, an image of the virtual space is captured by the virtual camera and displayed on the display 22, whereby the virtual object 101 is displayed in a superimposed manner on the image of the real space as shown in FIG. 6.

(Description of Virtual Space)

Next, various virtual objects placed in the virtual space are described. The XYZ coordinate system is set based on the marker 40 on the table, and a virtual space including a plurality of virtual objects is set. FIG. 7 is a diagram showing an example of a virtual space 100 including a plurality of virtual objects.

As shown in FIG. 7, in the game according to the exemplary embodiment, a virtual space is formed on the table. On the XZ plane (i.e., on the table), various virtual objects for forming terrains in the virtual space 100 are placed. For example, on the XZ plane, a ground object 141, a tree object 142, a river object 143, a bridge object 144, and a hill object 145 are placed. The hill object 145 is a virtual object having a height. At the top of the hill object 145, a character 110 is placed. For example, on the ground object 141, a character 130 is initially placed.

The character 110 is a virtual object relating to the first user and is controlled by the first user. In the game according to the exemplary embodiment, the position of the character 110 is fixed to the top of the hill object 145. The character 110 holds a bullet object 112. For example, if the first user swings the controller 18, the character 110 discharges the bullet object 112 into the virtual space 100. The discharged bullet object 112 moves in the virtual space 100. For example, if the bullet object 112 hits the character 130, the physical strength value of the character 130 decreases, or the character 130 falls down. If the character 130 falls down, the first user side wins.

At a position relating to the position of the character 110, a virtual camera 111 is placed. Specifically, the virtual camera 111 is placed at a position that matches the character 110 (e.g., the position of the eyes of the character 110). In FIG. 7, the position of the character 110 and the position of the virtual camera 111 seem to be shifted from each other, but actually, these positions match each other. The virtual camera 111 includes a left virtual camera 111L and a right virtual camera 111R. The left virtual camera 111L is a virtual camera for generating a left-eye virtual space image to be displayed on the left-eye display 12L of the first HMD 10. The right virtual camera 111R is a virtual camera for generating a right-eye virtual space image to be displayed on the right-eye display 12R of the first HMD 10. The left virtual camera 111L and the right virtual camera 111R are placed a predetermined distance (e.g., a distance in the virtual space relating to the average distance between the eyes of a user) away from each other in the virtual space 100.

The virtual camera 111 does not need to be placed exactly at the position of the eyes of the character 110, and for example, may be placed at a position where the character 110 is displayed and a position shifted in the up-down or left-right direction from the position of the eyes of the character 110. The virtual camera 111 may not be placed at the same position as that of the character 110, and may be placed at a position having a predetermined positional relationship with the character 110 (a position a predetermined distance away from the character 110). For example, the virtual camera 111 may be placed at a predetermined position behind the character 110. The virtual camera 111 may be placed at a predetermined position diagonally behind the character 110. That is, "the virtual camera 111 is placed at a position relating to the position of the character 110" includes both a case where the virtual camera 111 is placed at the same position as that of the character 110, and a case where the virtual camera 111 is placed at the position the predetermined distance away from the character 110.

The directions of the character 110 and the virtual camera 111 (111R and 111L) are set in accordance with the direction of the first user (the first HMD 10) in the real space. That is, the orientations of the character 110 and the virtual camera 111 operate in conjunction with the orientation of the first HMD 10 in the real space.

Figure 8:
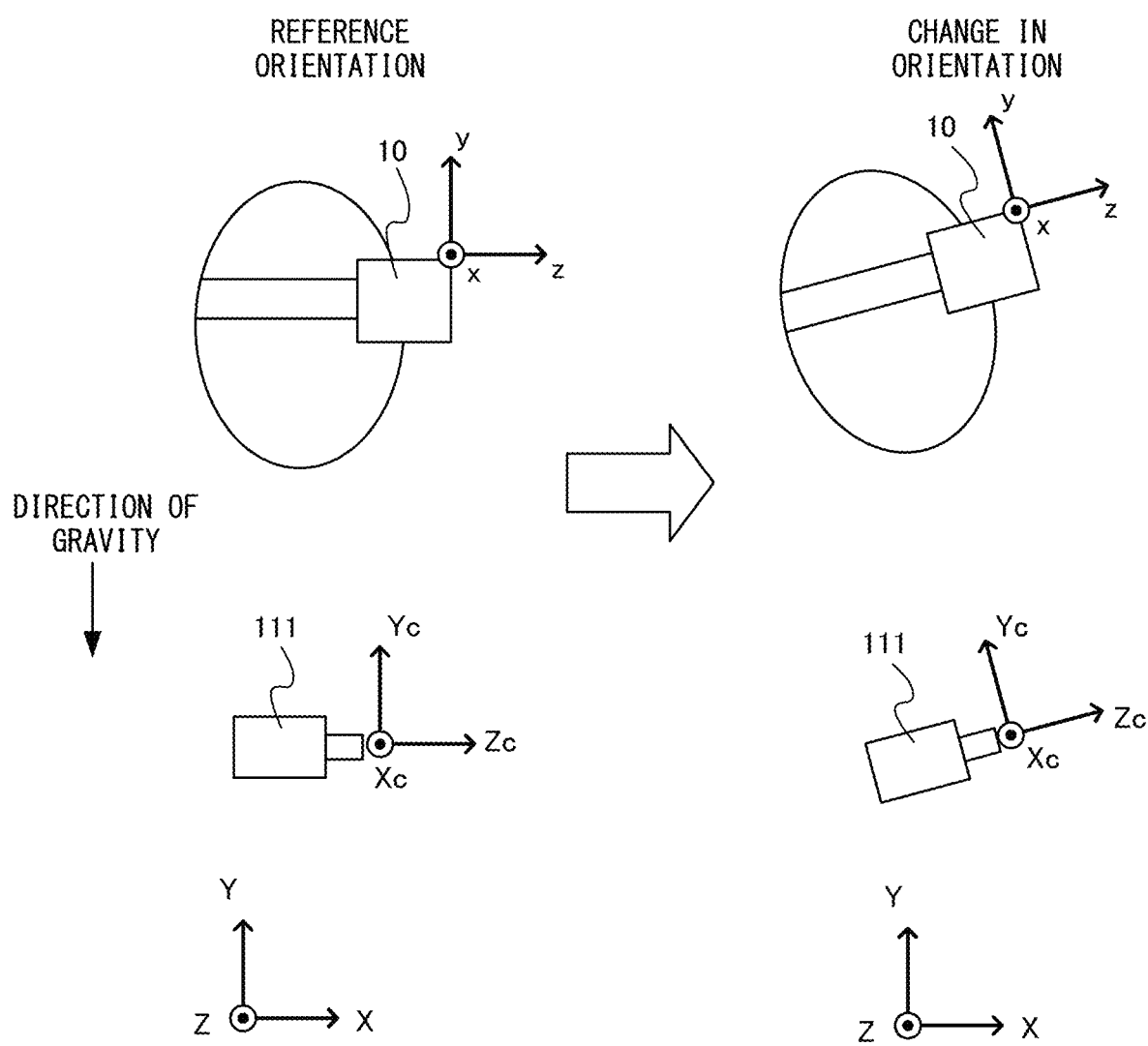
FIG. 8 is an example non-limiting diagram of the first HMD 10 and a virtual camera 111 viewed from the right side and is a diagram showing the state where the orientation of the virtual camera 111 changes in conjunction with a change in the orientation of the first HMD 10.

FIG. 8 is a diagram of the first HMD 10 and the virtual camera 111 viewed from the right side and is a diagram showing the state where the orientation of the virtual camera 111 changes in conjunction with a change in the orientation of the first HMD 10. In the virtual camera 111, a Zc-axis that is an axis in the direction of the line of sight, an Xc-axis that is an axis in the right direction, and a Yc-axis that is an axis in the up direction are set. As shown in FIG. 8, the orientation of the virtual camera 111 is controlled so that the Xc-axis, the Yc-axis, and the Zc-axis of the virtual camera 111 are parallel to the x-axis, the y-axis, and the z-axis, respectively, of the first HMD 10.

Specifically, the state where the direction of the z-axis of the first HMD 10 does not change from the time when the orientation of the first HMD 10 is initialized, and the y-axis of the first HMD 10 is directed in a direction opposite to the direction of gravity is referred to as a "reference orientation". When the first HMD 10 is in the reference orientation, the virtual camera 111 is directed forward (e.g., is directed in the positive X-axis direction) in the virtual space. That is, the Zc-axis indicating the direction of the line of sight of the virtual camera 111 is parallel to the X-axis in the virtual space. As shown in the diagram on the right side in FIG. 8, if the first user faces diagonally upward in the real space, the orientation of the first HMD 10 changes from the reference orientation, and the z-axis of the first HMD 10 is directed diagonally upward. In conjunction with this change in the orientation of the first HMD 10, the Zc-axis of the virtual camera 111 is also directed diagonally upward in the virtual space. Although not shown in the figures, for example, if the first HMD 10 rotates 30 degrees in the right direction from the reference orientation (rotates 30 degrees counterclockwise about the y-axis), the virtual camera 111 also rotates 30 degrees in the right direction in the virtual space (30 degrees counterclockwise about the Yc-axis).

As described above, the orientation of the virtual camera 111 (111R and 111L) is set to match the orientation of the first HMD 10 in the real space. The orientation of the character 110 also operates in conjunction with the orientation of the virtual camera 111. That is, the orientation of the first HMD 10 changes, whereby the orientation of the virtual camera 111 and the character 110 change. If the virtual camera 111 is placed at a position a predetermined distance away from the character 110 (e.g., a predetermined position behind the character 110), not only the orientation but also the position of the virtual camera 111 may change in accordance with the change in the orientation of the character 110.

On the other hand, even if the position of the first HMD 10 changes in the real space, the positions of the character 110 and the virtual camera 111 do not change, and the virtual camera 111 and the character 110 are fixed to the top of the hill object 145.

Referring back to FIG. 7, on the ground object 141, the character 130 is placed. The character 130 is a virtual object relating to the third user and is controlled by the third user. Specifically, in accordance with a key input to the controller 38 (an input to a button, an analog stick, or a directional pad), the character 130 moves in the virtual space 100. The orientation of the character 130 changes in accordance with the key input. The character 130 can move on the ground object 141, the bridge object 144, and the hill object 145. The third user moves the character 130 on the ground object 141 using the controller 38, and for example, moves the character 130 to the top of the hill object 145 through the bridge object 144. Then, if the character 130 reaches the top of the hill object 145, the character 130 and the character 110 start a battle against each other. If the character 130 defeats the character 110 in the battle, the third user side wins.

In the virtual space 100, a virtual camera 131 relating to the third user is set. The virtual camera 131 includes a left virtual camera 131L and a right virtual camera 131R. The left virtual camera 131L is a virtual camera for generating a left-eye virtual space image to be displayed on the left-eye display 32L of the second HMD 30. The right virtual camera 131R is a virtual camera for generating a right-eye virtual space image to be displayed on the right-eye display 32R of the second HMD 30. The left virtual camera 131L and the right virtual camera 131R are placed a predetermined distance away from each other.

The third user performs the game while viewing images generated based on the virtual camera 131. The third user can switch their point of view (i.e., the position of the virtual camera 131) between a first mode and a second mode. If the point of view is set to the first mode, the virtual camera 131 does not depend on the position of the character 130, and is placed at a position of looking down upon the virtual space 100.

Specifically, if the point of view is set to the first mode, the virtual camera 131 is placed at a position in the virtual space relating to the position of the second HMD 30 in the real space. By a method similar to the method described with reference to FIG. 6, the position of the second HMD 30 based on the marker 40 is calculated, and the virtual camera 131 is placed at the calculated position. That is, based on images captured by the cameras 33 of the second HMD 30, the marker 40 is detected, and based on the size, the shape, and the direction of the detected marker 40, the position of the second HMD 30 relative to the marker 40 is calculated. At a position in the virtual space relating to the calculated position of the second HMD 30, the virtual camera 131 is set. For example, the left virtual camera 131L is set at a position in the virtual space that matches the position of the left camera 33L of the second HMD 30 based on the marker 40, and the right virtual camera 131R is set at a position in the virtual space that matches the position of the right camera 33R of the second HMD 30 based on the marker 40.

On the other hand, if the point of view is set to the second mode, the virtual camera 131 is set at a position relating to the position of the character 130 (a position 131' in FIG. 7). For example, the virtual camera 131 may be set at a position that matches the character 130 (e.g., the position of both eyes of the character 130). The virtual camera 131 may be set at a predetermined position behind the character 130. If the point of view is set to the second mode, the virtual camera 131 moves by following the character 130.

In the virtual space 100, characters 120a and 120b are also placed. The character 120a is a virtual object relating to the second user a (the smart device 20a). The character 120b is a virtual object relating to the second user b (the smart device 20b).

At a position relating to the position of the character 120a, a virtual camera 121a is placed. The virtual camera 121a may be set at a position that matches the character 120a (e.g., the position of the head of the character 120a). The virtual camera 121a may be set at a predetermined position behind the character 120a. Similarly, at a position relating to the position of the character 120b, a virtual camera 121b is placed. The virtual camera 121b may be set at a position that matches the character 120b, or may be set at a predetermined position behind the character 120b.

As described with reference to FIG. 6, the positions of the character 120a and the virtual camera 121a are set in accordance with the position of the smart device 20a in the real space. For example, the positions of the character 120a and the virtual camera 121a in the virtual space 100 match the position of the smart device 20a relative to the marker 40 in the real space. Similarly, the positions of the character 120b and the virtual camera 121b in the virtual space 100 match the position of the smart device 20b relative to the marker 40 in the real space.

The orientations of the character 120a and the virtual camera 121a are controlled to match the orientation of the smart device 20a in the real space. Similarly, the orientations of the character 120b and the virtual camera 121b are controlled to match the orientation of the smart device 20b in the real space.

Since the position and the orientation of a character 120 (and a virtual camera 121) are controlled in accordance with the position and the orientation of the smart device 20 in the real space, if the second user moves while holding the smart device 20 or changes the direction of the smart device 20, the character 120 (and the virtual camera 121) also moves in the virtual space 100, or the direction of the character 120 (and the virtual camera 121) changes.

As shown in FIG. 7, in the virtual space 100, a virtual camera 150 is placed. The virtual camera 150 is a virtual camera for generating an image to be displayed on the stationary display 50 and is fixed in a predetermined orientation at a predetermined position in the virtual space 100. The virtual camera 150 is placed at a position of looking down upon the entirety of the virtual space 100. For example, the image capturing range of the virtual camera 150 includes the characters 110, 120, and 130, and an image of the virtual space including the characters 110, 120, and 130 is displayed on the display 50. The position and/or the orientation of the virtual camera 150 may be changed in accordance with an operation of the user.

On the display 50, the images of the virtual space viewed from the virtual camera 111 or the virtual camera 131 may be displayed. On the display 50, an image of the virtual space viewed from the virtual camera 121 may be displayed. The user may select any of the virtual cameras 111, 121, 131, and 150, and an image generated based on the selected virtual camera may be displayed on the display 50. On the display 50, the same image as the image displayed on the display 22 of the smart device 20 (the image obtained by superimposing the image of the virtual space on the image of the real space) may be displayed.

As described above, in the exemplary embodiment, the marker 40 is placed on a table, and a coordinate system of a virtual space is set based on the marker 40. An upper surface of the table relates to an XZ plane in the virtual space, and virtual objects are placed on the XZ plane. Consequently, when the table is viewed through the smart device 20, the virtual objects are displayed on the table, and it is possible to perform the game using the table like a display.

Figure 9:
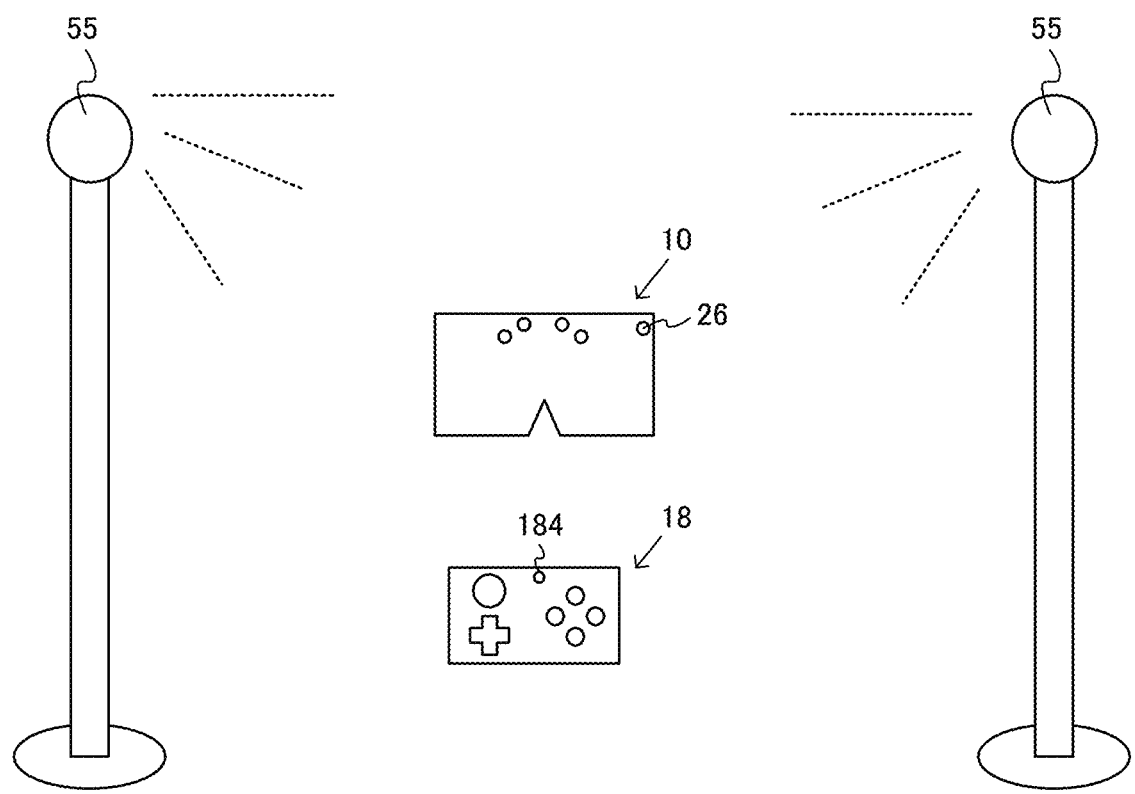
FIG. 9 is an example non-limiting diagram showing an example of a method for detecting the positions of the first HMD 10, the second HMD 30, and the controller 18 or 38.

The positions of the first HMD 10 and/or the second HMD 30 may be detected by the following method. FIG. 9 is a diagram showing an example of a method for detecting the positions of the first HMD 10, the second HMD 30, and the controller 18 or 38.

As shown in FIG. 9, two sensor bars 55 are placed at predetermined positions in the real space. For example, the sensor bars 55 output infrared light from their end portions at predetermined time intervals. For example, the infrared camera 14 (or another infrared receiving chip) of the first HMD 10 can receive the infrared light from the sensor bars 55, calculate the distances or the angles from the sensor bars 55, and calculate the position of the first HMD 10. The same applies to the second HMD 30. The controller 18 or 38 includes an infrared receiving chip that receives the infrared light from the sensor bars 55, and similarly detects the position of the controller 18 or 38. The method for detecting the positions of the first HMD 10, the second HMD 30, and the controller 18 or 38 is not limited to this, and these positions may be detected by another method. For example, one or more cameras may be installed in the real space, the first HMD 10, the second HMD 30, and the controller 18 or 38 may include light-emitting sections that emit predetermined light, and the cameras installed in the real space may receive the light from the light-emitting sections, whereby the positions in the real space of the first HMD 10, the second HMD 30, and the controller 18 or 38 may be detected.

The detected positions of the first HMD 10, the second HMD 30, and the controller 18 or 38 may be used in game control. For example, in the above description, the position of the second HMD 30 relative to the reference (the marker) in the real space is detected by capturing the marker 40 using the cameras 33 included in the second HMD 30. Alternatively, by the method shown in FIG. 9, the position of the second HMD 30 relative to the reference (the sensor bars) in the real space may be detected, and the detected position may be used in game control as described above. In this case, the positional relationships between the marker and the sensor bars in the real space are set, whereby the position of the second HMD 30 in the XYZ coordinate system based on the marker can be calculated.

For example, the position in the real space of the controller 18 may be detected, thereby detecting whether or not the controller 18 is swung. If the controller 18 is swung, the bullet object 112 may be discharged.

Information regarding the positions or the orientations of virtual objects (the characters 110, 120a, 120b, and 130, the virtual cameras 111, 121a, 121b, and 131, and the like) shown in FIG. 7 is transmitted to the information processing apparatus 60 via the network and managed in the information processing apparatus 60. For example, the smart device 20a detects the position and the orientation of the smart device 20a in the real space and sets the position and the orientation of the character 120a in the virtual space to match the detected position and orientation. The smart device 20a transmits information regarding the set position and orientation of the character 120a to the information processing apparatus 60. Position information and the like regarding virtual objects related to terrains (141 to 145 and the like) placed in the virtual space 100 are managed in the information processing apparatus 60. Operation information relating to an operation on the controller 18 or 38 is transmitted to the information processing apparatus 60.

Based on the information regarding the virtual objects or the operation information regarding the controller 18 or 38, the information processing apparatus 60 performs a game control process. As a result of the game control process, images of the virtual space are displayed on the first HMD 10 and the second HMD 30. The smart device 20 acquires the information regarding the virtual objects from the information processing apparatus 60, performs game processing itself, and displays an image based on the result of the game processing on the display 22. An example of an image displayed in each device is described below.

(Example of Image Displayed in Each Device)

Figure 10:
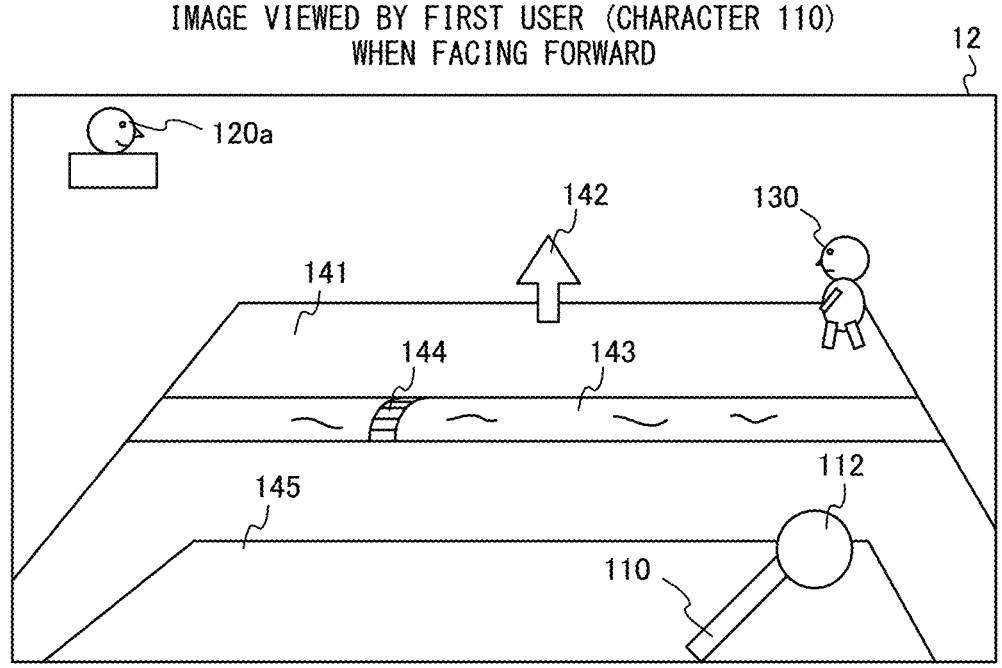
FIG. 10 is an example non-limiting diagram showing an example of an image displayed on displays 12 of the first HMD 10 and is an example of an image when a first user faces forward.

FIG. 10 is a diagram showing an example of an image displayed on the displays 12 of the first HMD 10 and is an example of an image when the first user faces forward. On the displays 12 of the first HMD 10, an image of the virtual space 100 viewed from the virtual camera 111 is displayed. FIG. 10 shows a single image in a planar manner, but actually, images having parallax are displayed on the right-eye display 12R and the left-eye display 12L and recognized as a stereoscopic image by the first user. The field of view of the first user is almost covered by the displays 12 of the first HMD 10.

As shown in FIG. 10, on the displays 12 of the first HMD 10, an image looking down upon the entirety of a terrain including the character 130 from the top of the hill object 145 is displayed. It looks to the first user as if the virtual space spread before their eyes, and the first user has a feeling as if standing at the top of the hill object 145. In the field of view of the first user, a part of the right hand of the character 110 is viewed, and the state where the right hand holds the bullet object 112 is viewed. The size of the right hand of the character 110 viewed from the first user is a size similar to the size of the right hand of the first user viewed by the first user in the real space. That is, the scale in the virtual space viewed from the first user is almost the same as the scale in the real space. The orientation of the right hand of the character 110 is the same as the orientation of the controller 18 in the real space. If the first user raises their right hand holding the controller 18, the right hand of the character 110 is also raised.

It looks to the first user as if the character 130 were located on the right side in the depth direction on the ground object 141. It looks to the first user as if the character 130 were present several tens of meters away, for example. In an upper left direction away from the ground object 141, the character 120a is viewed. It looks as if the character 120a were floating in the virtual space.

Figure 11:
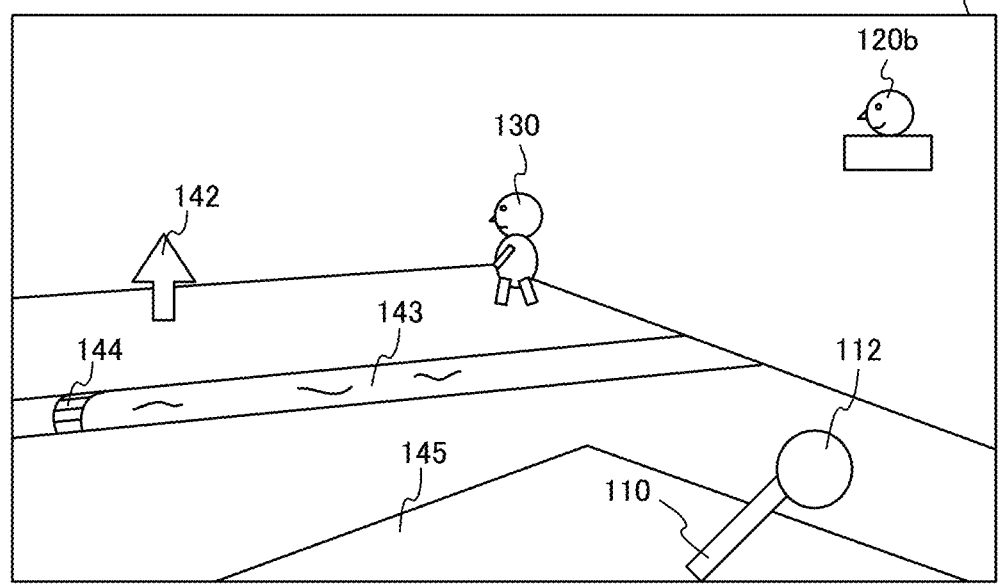
FIG. 11 is an example non-limiting diagram showing an example of an image displayed on the displays 12 of the first HMD 10 and is an example of an image when the first user faces rightward.

If the first user faces rightward in the real space in the state shown in FIG. 10, an image as shown in FIG. 11 is displayed. FIG. 11 is a diagram showing an example of an image displayed on the displays 12 of the first HMD 10 and is an example of an image when the first user faces rightward.

As shown in FIG. 11, if the first user faces rightward, the virtual camera 111 and the character 110 in the virtual space also face rightward, and for example, the character 130 is displayed almost in front. The character 120b, which is not displayed in FIG. 10, is displayed at the upper right in FIG. 11. The character 120a, which is displayed in FIG. 10, is not displayed in FIG. 11.

Here, the first user attacks the character 130 using the bullet object 112. For example, if the first user swings the controller 18 that the first user holds, the character 110 performs the operation of swinging its right arm in the virtual space, and the bullet object 112 is discharged into the virtual space. The bullet object 112 may be discharged into the virtual space in accordance with an operation on the buttons 181 of the controller 18.

Figure 12:
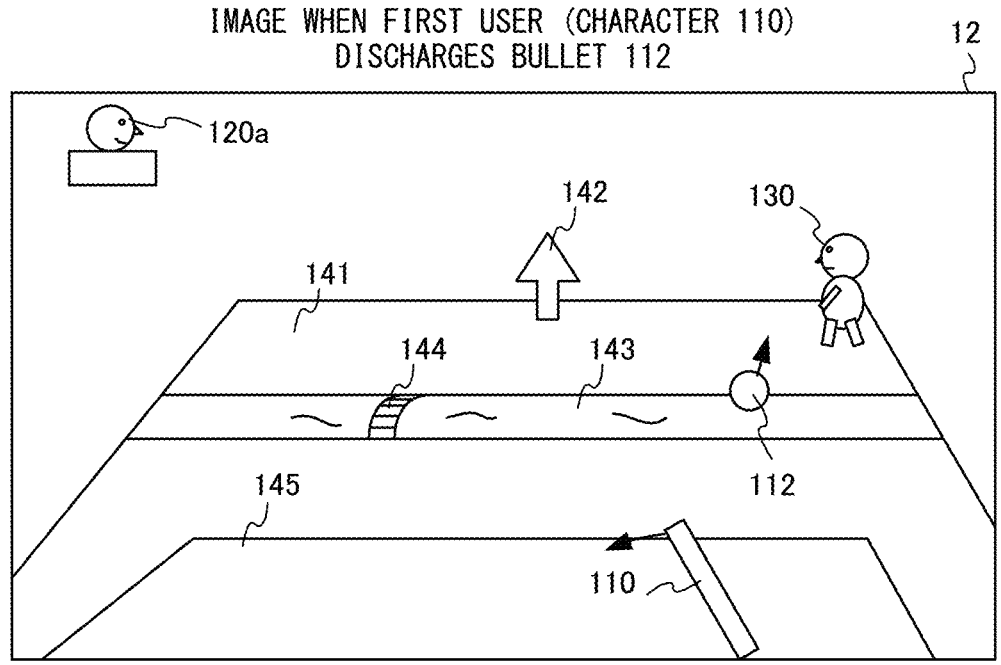
FIG. 12 is an example non-limiting diagram showing an example of the state where a bullet object 112 is discharged into the virtual space in the state shown in FIG. 10.

FIG. 12 is a diagram showing an example of the state where the bullet object 112 is discharged into the virtual space in the state shown in FIG. 10. As shown in FIG. 12, for example, if the first user swings the controller 18, the bullet object 112 is discharged into the virtual space, and the bullet object 112 moves in the virtual space. The moving direction of the bullet object 112 may be determined based on, for example, the direction in which the controller 18 is swung by the first user, or a direction indicated using the analog stick 182 or the directional pad 183. If the bullet object 112 hits the character 130, the physical strength value of the character 130 decreases, or the character 130 falls down.

Figure 13:
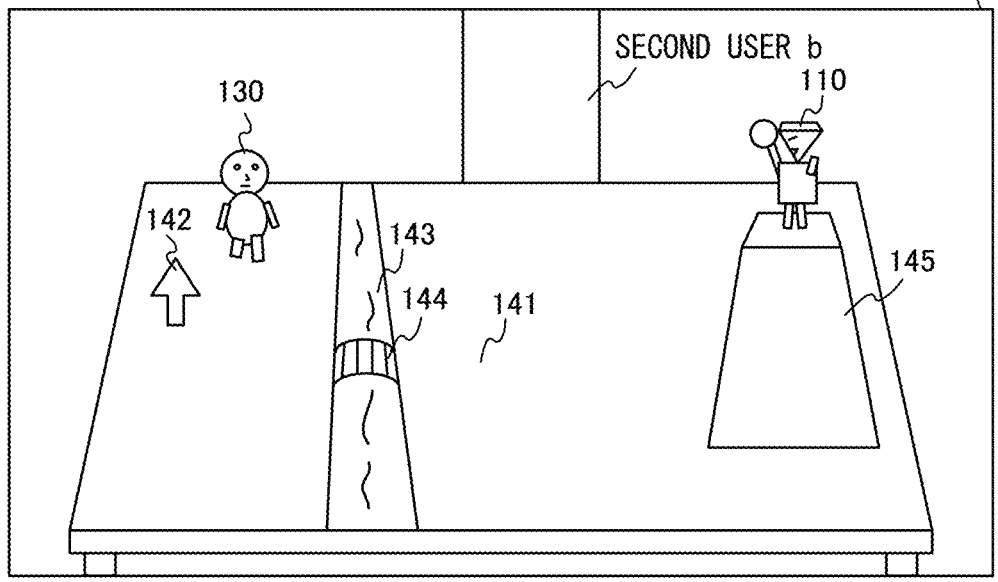
FIG. 13 is an example non-limiting diagram showing an example of an image displayed on a display 22 of a smart device 20a and is an example of an image when a second user a is located at a position shown in FIG. 1.

FIG. 13 is a diagram showing an example of an image displayed on the display 22 of the smart device 20a and is an example of an image when the second user a is located at the position shown in FIG. 1. On the display 22 of the smart device 20a, a bird's-eye view image of the virtual space 100 from the virtual camera 121a is displayed. Specifically, on the display 22, an image of the virtual space generated based on the virtual camera 121a is displayed in a superimposed manner on an image of the real space captured by the camera 23 of the smart device 20a. On the display 22, an image as if the virtual space were placed on the table in the real space is displayed. For example, in FIG. 13, images (141 to 145, 110, and 130) on the table are images of the virtual space, and an image in the periphery of the table including an image of the second user b is an image of the real space. In the example of FIG. 13, the image capturing range of the camera 23 of the smart device 20a does not include the smart device 20b, and therefore, the character 120b is not displayed on the display 22 of the smart device 20a. If the image capturing range of the camera 23 of the smart device 20a includes the smart device 20b, the character 120b is displayed in a superimposed manner on the image of the second user b at the position of the smart device 20b. Alternatively, in a case where the image of the real space captured by the camera 23 is not displayed on the display 22 of the smart device 20a, and if the image capturing range of the camera 23 of the smart device 20a includes the smart device 20b, only the character 120b may be displayed at the position of the smart device 20b.

As described above, the second user a views a small virtual space formed on the table by looking down upon the small virtual space from the position of the second user a shown in FIG. 1 (the position of the virtual camera 121a shown in FIG. 7) using the smart device 20a.

If the second user a changes the position or the orientation of the smart device 20a in the state shown in FIG. 13, the image displayed on the display 22 of the smart device 20a also changes.

Figure 14:
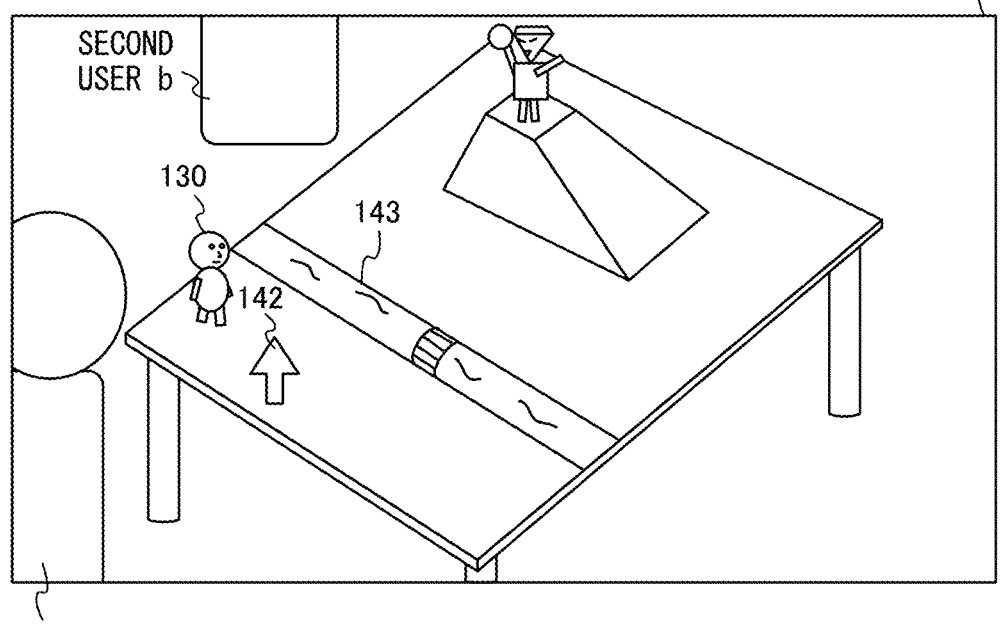
FIG. 14 is an example non-limiting diagram showing an example of an image displayed on the display 22 of the smart device 20a after the second user a moves closer to a third user.

FIG. 14 is a diagram showing an example of an image displayed on the display 22 of the smart device 20a after the second user a moves closer to the third user. If the smart device 20a moves in the real space, the virtual camera 121a also moves in the virtual space. If the second user a moves closer to the third user, an image of the table including the marker 40 as diagonally viewed from the camera 23 of the smart device 20a is acquired, and the position of the virtual camera 121a is set based on the acquired image. As shown in FIG. 14, on the display 22, an image of the virtual space viewed from the virtual camera 121a after the movement is displayed in a superimposed manner on an image of the real space viewed from the camera 23 after the movement.

Here, in accordance with an operation on the smart device 20, the second user can discharge a virtual object for changing the character 130 to the virtual space. Specifically, the second user can discharge a virtual object for assisting the character 130 (the third user) to the virtual space.

Figure 15:
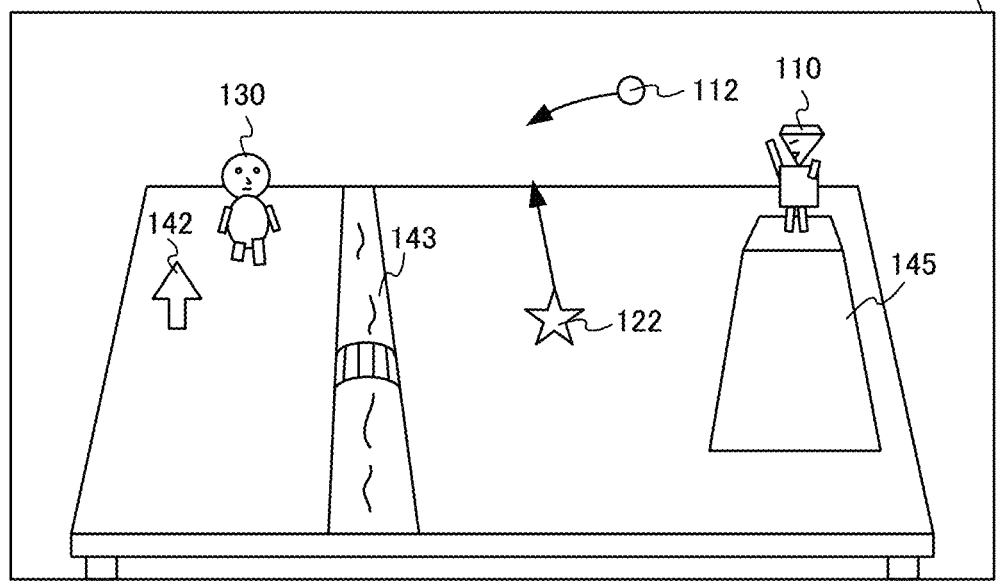

FIG. 15 is a diagram showing an example of the state where the character 120a discharges a bullet object 122 in accordance with an operation on the smart device 20a.

For example, on the display 22 of the smart device 20a, a touch panel is provided. In accordance with a touch operation (e.g., a tap operation, a swipe operation, or the like) on the touch panel of the smart device 20a, the character 120a discharges the bullet object 122. The bullet object 122 is a virtual object for assisting the character 130 (the third user). Specifically, the bullet object 122 is an object for preventing the bullet object 112 discharged from the character 110 (the first user) from hitting the character 130. For example, if the bullet object 122 hits the bullet object 112, the bullet object 112 disappears, and the attack on the character 130 becomes invalid.

The assistance of the second user for the third user may be made by another method. For example, in accordance with an operation of the second user, an obstacle object for defending against the bullet object 112 from the character 110 may be placed in the virtual space. The obstacle object may prevent the bullet object 112 from the character 1110 from hitting the character 130. For example, in accordance with an operation of the second user, the character 120 may discharge a recovery object for recovering the physical strength value of the character 130 into the virtual space. The recovery object discharged from the character 120 is placed in the virtual space. If the character 130 moves to the position where the recovery object is placed, and acquires the recovery object, the physical strength value of the character 130 is recovered. Consequently, the second user may assist the third user. In accordance with an operation of the second user, the character 120 may discharge a bullet object, thereby attacking the character 110. If the bullet object from the character 120 hits the character 110, the physical strength value of the character 110 may decrease, or the attack of the character 110 on the character 130 may stop. Consequently, the second user may assist the third user.

As described above, the second user assists the character 130 (the third user) and thereby can participate in a battle game performed by the first user and the third user.

Conversely, the second user may not assist the third user, but may assist the first user. For example, the character 120 may discharge an object for attacking the character 130 into the virtual space. The character 120 may place a recovery object for recovering the physical strength of the character 110 in the virtual space. The character 120 may place an obstacle object for defending against the attack of the character 130 on the character 1110 in the virtual space.

That is, the character 120 may place a predetermined object advantageous or disadvantageous in the game for the character 130 (or the character 110) in the virtual space. The character 120 changes the character 110 using the predetermined object. The character 120 is a character that influences the virtual space or the character 110 in accordance with an input from the second user.

The second user may participate in the game on an equal basis with the first user and the third user. That is, a game may be performed where each user (character) of the first user, the second user, and the third user attacks other users (characters) and defeats the other users.

Alternatively, not only a game where characters battle against each other, but also another game where characters perform actions in a virtual space may be performed. For example, a game may be performed where characters of users cooperate to have an adventure, or a racing game may be performed where characters of users race.

Figure 16:
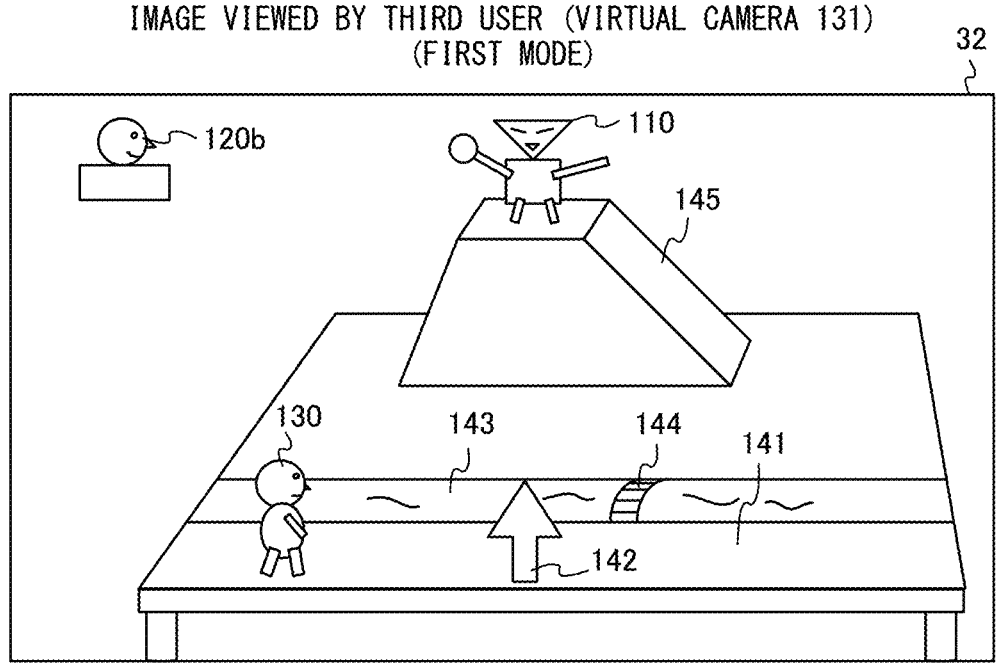
FIG. 16 is an example non-limiting diagram showing an example of an image displayed on displays 32 of the second HMD 30 and is an example of an image when a virtual camera 131 is set to a first mode.

FIG. 16 is a diagram showing an example of an image displayed on the displays 32 of the second HMD 30 and is an example of an image when the virtual camera 131 is set to the first mode. The image displayed on the displays 32 of the second HMD 30 is also a stereoscopic image, similarly to the first HMD 10.

As described above, if the virtual camera 131 is set to the first mode, the virtual camera 131 is placed in accordance with the position of the second HMD 30 based on the marker 40 in the real space. For example, if the second HMD 30 is located at a position of looking down upon the table (e.g., the position shown in FIG. 1), the virtual camera 131 is placed at a position of looking down upon the virtual space on the table (e.g., the position of the character 130 shown in FIG. 7). In this case, as shown in FIG. 16, on the displays 32 of the second HMD 30, virtual objects (the character 130, the character 110, and the virtual objects 141 to 145) in the virtual space formed on the table are displayed. If the character 120b located at a position away from the table is included in the field of view of the virtual camera 131, the character 120b is also displayed. If the position or the orientation of the second HMD 30 changes, the position or the orientation of the virtual camera 131 also changes in accordance with the change.

If the character 110 discharges the bullet object 112 into the virtual space, an image is displayed in which the bullet object 112 moves in the virtual space. If the character 120*b* or the character 120*a* discharges the bullet object 122 into the virtual space, an image is displayed in which the bullet object 122 moves in the virtual space.

On the displays 32 of the second HMD 30, an image of the virtual space generated based on the virtual camera 131 is displayed in a superimposed manner on an image of the real space captured by the cameras 33 of the second HMD 30. If the virtual camera 131 is set to the first mode, it looks to the third user as if a small virtual space were formed on the table in the real space. That is, if the virtual camera 131 is set to the first mode, the third user views the small virtual space formed on the table by looking down upon the small virtual space, similarly to the second user of the smart device 20. On the displays 32 of the second HMD 30, the image of the real space may not be displayed, and only the image of the virtual space generated based on the virtual camera 131 may be displayed.

The third user can switch to either of the first mode and the second mode using the controller 38.

Figure 17:
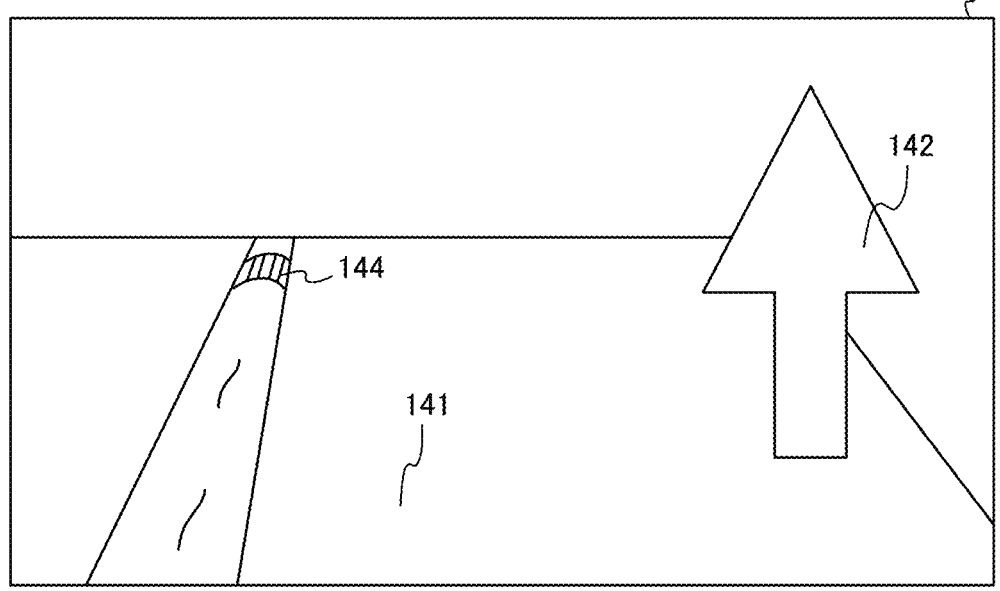
FIG. 17 is an example non-limiting diagram showing an example of an image displayed on the displays 32 of the second HMD 30 and is an example of an image when the virtual camera 131 is set to a second mode.

FIG. 17 is a diagram showing an example of an image displayed on the displays 32 of the second HMD 30 and is an example of an image when the virtual camera 131 is set to the second mode.

As shown in FIG. 17, on the displays 32 of the second HMD 30, an image of the virtual space viewed from the character 130 is displayed. If the virtual camera 131 is set to the second mode, the virtual camera 131 moves in accordance with the movement of the character 130. FIG. 17 shows an image in a case where the virtual camera 131 is placed at the position of the character 130. If, however, the virtual camera 131 is set at, for example, a predetermined position behind the character 130, an image of the virtual space viewed from behind the character 130 is displayed.

If the virtual camera 131 is set to the second mode, it looks to the third user as if the virtual space spread before their eyes, and the third user has a feeling as if standing on the ground object 141. It looks to the third user as if the bridge object 144 were present several tens of meters away, for example.

The third user performs an operation on the controller 38 while viewing an image as shown in FIG. 16 or 17, thereby moving the character 130 in the virtual space. For example, the third user moves the character 130 in accordance with an operation on the analog stick or the directional pad of the controller 38. If the character 130 reaches the position of the character 110, the third user causes the character 130 to attack the character 110 in accordance with an operation on a button of the controller 38.

The actions of the first user, the second user, and the third user and operations on the controllers are reflected on the virtual space in real time. For example, if the direction of the first user (the first HMD 10) changes, the direction of the character 110 changes in the virtual space in accordance with the change in the direction. If the first user swings the controller 18, the character 110 performs the operation of throwing the bullet object 112. If the character 110 is included in the image capturing range of the virtual camera 121 or the virtual camera 131, the state where the direction of the character 110 changes or the state where the character 110 throws the bullet object 112 is displayed on the smart device 20 or the second HMD 30. Consequently, the second user or the third user can grasp the action of the first user.

Similarly, if the direction or the position of the second user (the smart device 20) changes, the direction or the position of the character 120 changes in the virtual space in accordance with the change in the direction or the position. If the second user performs a predetermined operation on the smart device 20, the character 120 performs the operation of throwing the bullet object 122. If the character 120 is included in the image capturing range of the virtual camera 111 or the virtual camera 131, the state where the direction or the position of the character 120 changes or the state where the character 120 throws the bullet object 122 is displayed on the first HMD 10 or the second HMD 30. Consequently, the first user or the third user can grasp the action of the second user.

As described above, in the exemplary embodiment, the first user wears the first HMD 10, and the second user carries the smart device 20. Regardless of the position in the real space of the first HMD 10, the character 110 is placed in the virtual space, and the virtual camera 111 is placed at a position relating to the position of the character 110. The orientation of the character 110 changes in accordance with the orientation of the first HMD 10, and the character 110 performs an action in accordance with an operation on the controller 18 (e.g., throws the bullet object 112). The virtual camera 121 is placed at a position in the virtual space relating to the position of the smart device 20 relative to the marker 40 in the real space, and the orientation of the virtual camera 121 is set in accordance with the orientation of the smart device 20 in the real space. Specifically, the XYZ coordinate system for defining a position in the virtual space is set based on the marker 40 in the virtual space, thereby associating the real space and the virtual space. The position of the smart device 20 based on the marker 40 is calculated, and the character 120 and the virtual camera 121 are set at the calculated position. Then, an image of the virtual space generated based on the virtual camera 111 is displayed on the displays 12 of the first HMD 10, and an image of the virtual space generated based on the virtual camera 121 is displayed on the display 22 of the smart device 20.

Consequently, the first user views the virtual space from the character 110 at a position in the virtual space (or a position a predetermined distance away from the character 110) and views the virtual space from a first-person point of view. Thus, the first user can enter the virtual space with the same sense of scale as in the real space and perform the game. If the virtual camera 131 is set to the second mode, the third user also views the virtual space from the point of view of the character 130 (or a position a predetermined distance away from the character 130). In contrast, the second user views the virtual space associated with the real space from the position of the smart device 20 relative to the marker 40 in the real space. The second user can perform the game with an awareness of the real space and the virtual space with a feeling as if virtual objects in the virtual space were present in the real space, and can perform the game while looking down upon the virtual space formed on the table. The second user feels as if the virtual space were formed on a small scale on the table. In this manner, the first user who views the virtual space from a first-person point of view and the second user who views the virtual space from an overhead point of view can perform the game. The users can view the virtual space from different points of view, and the users can also view the virtual space with different senses of scale. Thus, a plurality of users can perform a non-conventional new game.

In the exemplary embodiment, the marker 40 is placed on the table, a virtual space is formed on the table, and the game is performed in the virtual space. The first user can enter the virtual space formed on the table and perform the game, while the second user can perform the game while looking down upon a small virtual space formed on the table. Consequently, a plurality of users can perform a non-conventional new game.

In the exemplary embodiment, the first user to the third user view the displays of their devices and thereby can view the motions of characters relating to other users and can recognize the motions of other users. For example, the first user views the motion of the character 120 displayed on the displays 12 of the first HMD 10 and thereby can recognize the motion of the second user. Since the position of the character 120 is set in the virtual space in conjunction with the position of the smart device 20 in the real space, the first user can grasp the position of the second user in the real space by viewing the character 120 in the virtual space. The second user views a change in the orientation of the character 110 and the action of the character 110 throwing the bullet object 112 on the display of their smart device 20 and thereby can recognize the motion of the first user.

Basically, in a case where a user wears an HMD, another user cannot grasp what video the user wearing the HMD is viewing and what the user wearing the HMD is doing in the virtual space. In the system according to the exemplary embodiment, however, the second user can view the state of the virtual space and the first user in the real space through the smart device 20 and therefore can grasp what video the first user is viewing and what the first user is doing in the virtual space. That is, the second user views the smart device 20 and thereby can view the motion of the character 110 (the first user) in the virtual space, and also looks at the real space and thereby can view the motion of the first user. Consequently, the second user can enter the virtual space where a user wearing an HMD is, and view the virtual space.

Here, on the stationary display 50, an image of the virtual space viewed from the virtual camera 150 is displayed. An image viewed by a user wearing an HMD may be displayed on the stationary display 50. The fourth user views the image displayed on the display 50 and thereby can grasp the state of the virtual space where the user wearing the HMD is. The second user can also grasp the state of the virtual space where the user wearing the HMD is, through the smart device 20. The second user can not only merely view the inside of the virtual space, but also have a non-conventional new experience using AR technology. That is, the virtual space is formed in response to the real space, and therefore, the second user moves in the real space or changes its direction and thereby can look into the virtual space from the same point of view as the point of view of the second user in the real space. Consequently, the second user can view the virtual space where the first user is, as if viewing the real space.

Normally, the first user performs the game by staying on the mat 51. However, if the first user comes out of a predetermined range based on the mat 51, or if the first user moves by a predetermined distance or more, a notification is given to the first user. For example, an image or text may be displayed on the displays 12 of the first HMD 10, or a notification may be given by a sound, or a notification may be given by a vibration. If the first user comes out of the predetermined range, or if the first user moves by the predetermined distance or more, a notification is also given to the second user. For example, an image or text may be displayed on the display 22 of the smart device 20, or a notification may be given by a sound, or a notification may be given by a vibration. Similarly, a notification may also be given to the third user and the fourth user. If the second user enters the predetermined range or comes close to the predetermined range, a notification is given to the first user and the second user using an image, text, a sound, a vibration, or the like.

For example, the image processing system 1 detects the position of the first HMD 10 by the method shown in FIG. 9. Based on the position of the first HMD 10, the image processing system 1 determines whether or not the first user comes out of the predetermined range, or whether or not the first user moves by the predetermined distance or more. Alternatively, an image of the first user may be captured by the camera of the smart device 20 or the second HMD 30 or another camera placed in the real space, and based on the captured image, it may be determined whether or not the first user comes out of the predetermined range, or whether or not the first user moves by the predetermined distance or more. Yet alternatively, the periphery of the first user may be captured by the camera of the first HMD 10, and based on the captured image, it may be determined whether or not the first user comes out of the predetermined range, or whether or not the first user moves by the predetermined distance or more. Yet alternatively, based on an image captured by the first HMD 10, the smart device 20, the second HMD 30, or another camera, it may be determined whether or not the second user enters the predetermined range, or whether or not the second user comes close to the predetermined range.

On the display 22 of the smart device 20, an image indicating the above predetermined range may be displayed. That is, if the camera 23 of the smart device 20 captures the predetermined range based on the above mat 51, a range image indicating the predetermined range may be displayed in a superimposed manner on the predetermined range.

A predetermined range may also be set for the third user. If the third user comes out of the predetermined range, or if the third user moves by a predetermined distance or more, a notification may be given to the third user, the second user, and the first user. In this case, the marker 40 may be captured by the cameras 33 of the second HMD 30, and the virtual camera 131 may be placed in accordance with the position of the second HMD 30 relative to the marker 40 in the real space. That is, the third user also experiences AR similarly to the second user. If the third user comes out of the predetermined range, or if the third user moves by the predetermined distance or more, a notification (a notification using the displays 32, a speaker, a vibration motor, or the like) may be given to the third user, and a notification (a notification using the display 22, a speaker, a vibration motor, or the like) may also be given to the second user.

(Creation of Virtual Space)

Figure 18:
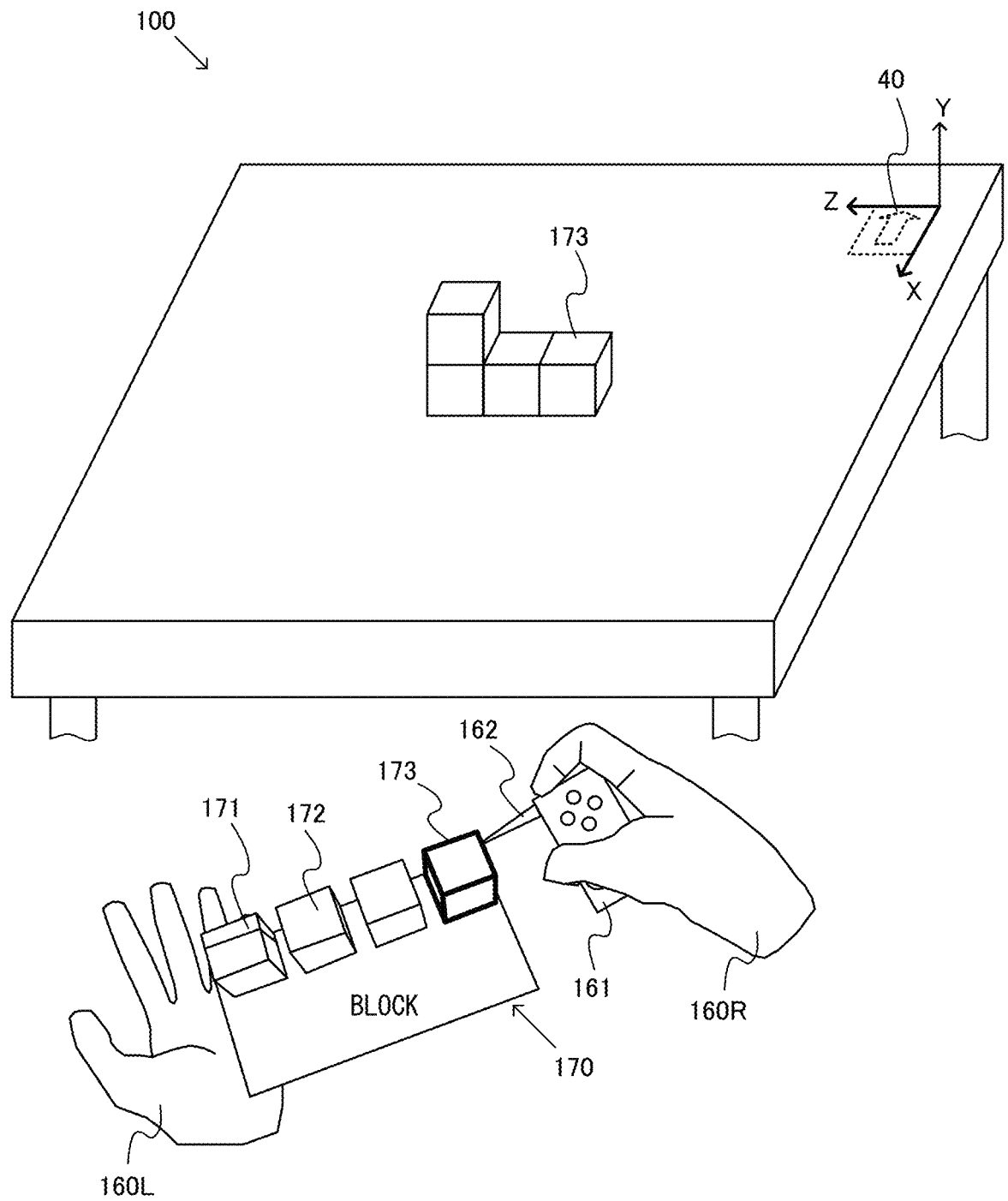
FIG. 18 is an example non-limiting diagram showing an example of an image viewed by a user in a creation mode.

In the exemplary embodiment, in addition to a game mode where the above game is performed, there is a creation mode where a user themselves creates a virtual space for performing the above game. A description is given below of the process in which the user creates the virtual space in the creation mode. FIG. 18 is a diagram showing an example of an image viewed by the user in the creation mode.

In the virtual space creation mode, for example, the user wears the first HMD 10 and places virtual objects in the virtual space using the controller 18 while viewing the displays 12 of the first HMD 10. The marker 40 is placed on the table, and the marker 40 on the table is captured by the camera 13 of the first HMD 10, whereby an image as shown in FIG. 18 is displayed on the displays 12 of the first HMD 10.

In the creation mode, a virtual camera is placed at a position in the virtual space relating to the position of the first HMD 10 relative to the marker 40 in the real space. The user creates the virtual space while viewing an image viewed from the virtual camera.

Specifically, on the displays 12 of the first HMD 10, a left hand object 160L representing the left hand of the user and a right hand object 160R representing the right hand of the user are displayed. The left hand object 160L and the right hand object 160R are virtual objects. Based on an image captured by the infrared camera 14 of the first HMD 10, the hands of the user are detected. The hands of the user are detected using a known image recognition technique. If the left hand and the right hand of the user are detected, the left hand object 160L and the right hand object 160R are placed at the positions of the detected left hand and right hand.

Based on an image from the camera 13 of the first HMD 10, the hands of the user may be detected. The hands of the user may be captured and detected by a camera or an infrared camera different from the cameras included in the first HMD 10.

For example, if the user directs the palm of their left hand to the first HMD 10, a UI object 170 is displayed in a superimposed manner on the left hand object 160L or near the left hand object 160L. The UI object 170 is a user interface for creating the virtual space and includes a plurality of part objects to be placed in the virtual space. For example, the UI object 170 includes a part object 171 for forming the ground object 141, the surface of which is covered by grass, a part object 172 for forming the river object 143, and a part object 173 for forming a block. The UI object 170 may include a plurality of part objects for forming terrains in the virtual space in addition to these objects.

Each part object is formed into a cube, for example, and a plurality of part objects are placed in a grid, thereby forming a terrain in the virtual space. For example, the ground object 141 covered by grass is formed by placing a plurality of part objects 171 in a grid. For example, a green texture image is pasted to an upper surface of each part object 171, and the plurality of part objects 171 are arranged in a planar manner, thereby forming the ground object 141, an upper surface of which is covered by grass.

In the right hand object 160R, a controller object 161 representing the controller 18 is displayed. An image is displayed in which the right hand object 160R holds the controller object 161 like the right hand holds the controller 18 in the real space. For example, based on an image captured by the camera 13 of the first HMD 10, the controller 18 may be detected. If the controller 18 is detected, the controller object 161 may be displayed. Alternatively, the controller 18 may not be detected, and if the right hand of the user is detected, the controller object 161 may be displayed together with the right hand object 160R.

The controller object 161 is a virtual object having substantially the same external appearance as that of the controller 18 and includes portions representing a plurality of buttons similarly to the controller 18. The controller object 161 also includes portions representing an analog stick and a directional pad.

At a predetermined position in the controller object 161, an indication object 162 for indicating a part object in the UI object 170 is provided. The indication object 162 is an object protruding from the predetermined position in the controller object 161. If the end of the indication object 162 is brought close to a part object, the part object can be indicated.

For example, if the user brings the end of the indication object 162 close to the part object 173 while viewing the displays 12 of the first HMD 10, the part object 173 is indicated. If the user presses, for example, a predetermined button of the controller 18 in this state, the state changes to the state where the part object 173 is selected (the state where the part object 173 is grabbed). As shown in FIG. 18, the selected part object is displayed in a display form different from those of other objects that are not selected. Text indicating the selected part object (the text "block" in FIG. 18) is also displayed on the UI object 170. If the user moves their right hand onto the table in the state where the part object 173 is selected, and the user performs a predetermined operation (e.g., the operation of separating the finger from the button), the part object 173 is placed on the table (on the XZ plane). The user places a plurality of part objects in the virtual space using the controller 18 by grabbing the part objects one by one and placing each part object on the table, and thereby can form a terrain in the virtual space where a character is placed.

The determination of whether or not a part object is selected may be made based on the motions of the fingers of the right hand of the user. For example, it may be determined whether or not the user flexes the fingers, and if the user flexes the fingers, an indicated part object may be selected.

As described above, if the right hand of the user is detected, the controller object 161 is displayed in the right hand object 160R. The indication object 162 is also displayed at the predetermined position in the controller object 161. The controller object 161 having substantially the same external appearance as that of the controller 18 held by the user is placed in the virtual space, whereby the user wearing the first HMD 10 can view a video similar to that of the controller 18 that the user actually holds. Thus, it is easy to place a part object in the virtual space. The indication object 162 that is not present in the real space is displayed in the virtual space, and therefore, it is easy for the user wearing the first HMD 10 to indicate a position using the indication object 162. Thus, it is possible to easily select and place a part object.

In a case where the user selects and places a part object, a plurality of selected part objects may be placed in the virtual space. For example, if the user moves their right hand parallel to the surface of the table in the state where a single part object is selected, a plurality of selected part objects may be arranged in a planar manner.

Figure 19:
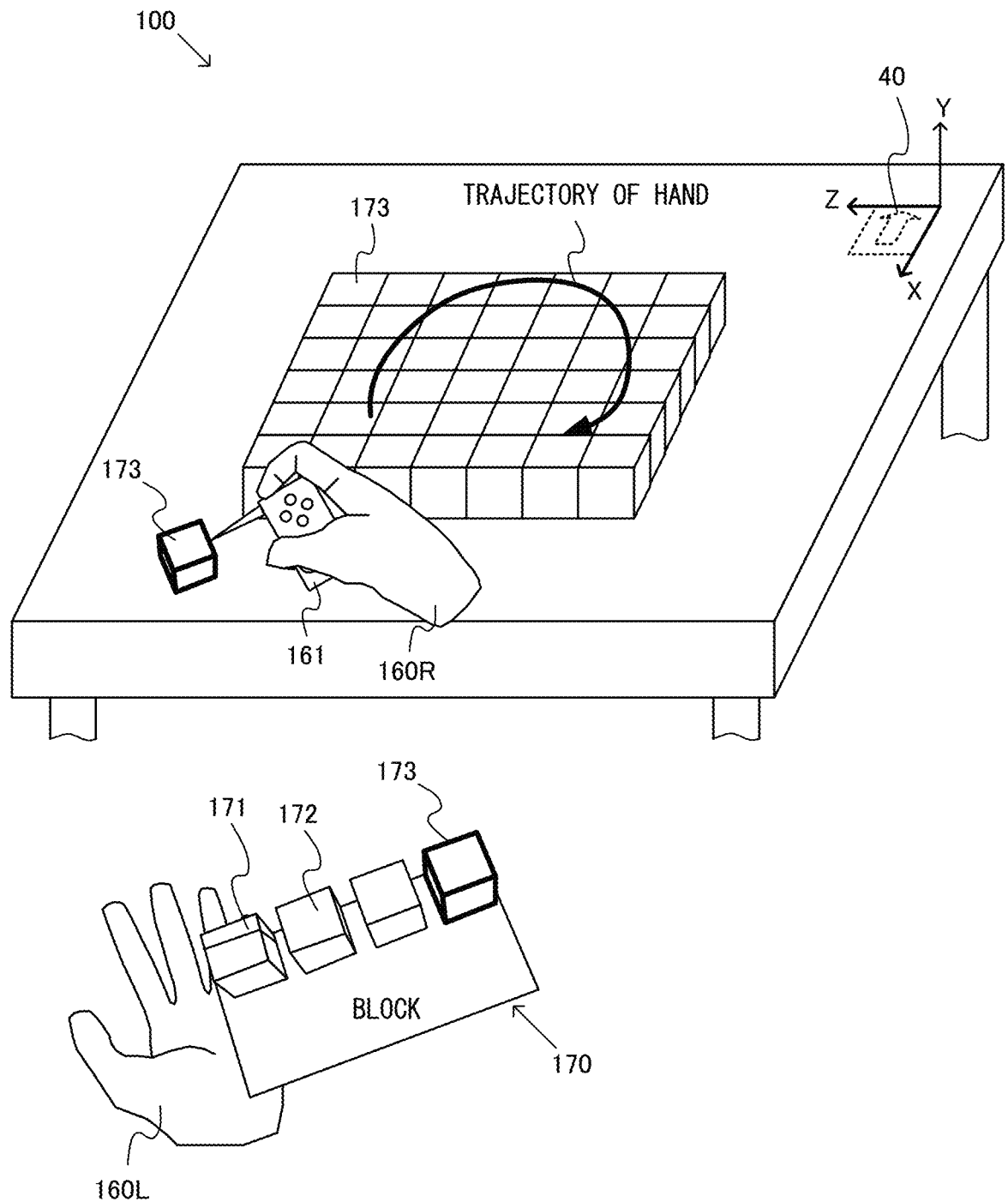
FIG. 19 is an example non-limiting diagram showing the state where a plurality of part objects 173 are arranged in a planar manner.

FIG. 19 is a diagram showing the state where a plurality of part objects 173 are arranged in a planar manner. As shown in FIG. 19, for example, if the user moves their right hand almost parallel to the table by drawing a semicircle in the state where the part object 173 is selected, part objects 173 may be arranged in a planar manner in an area surrounded by the trajectory of the right hand. Further, if the user performs a similar action, a plurality of part objects 173 may be further placed in a planar manner on the plurality of part objects 173 arranged in a planar manner.

Figure 20:
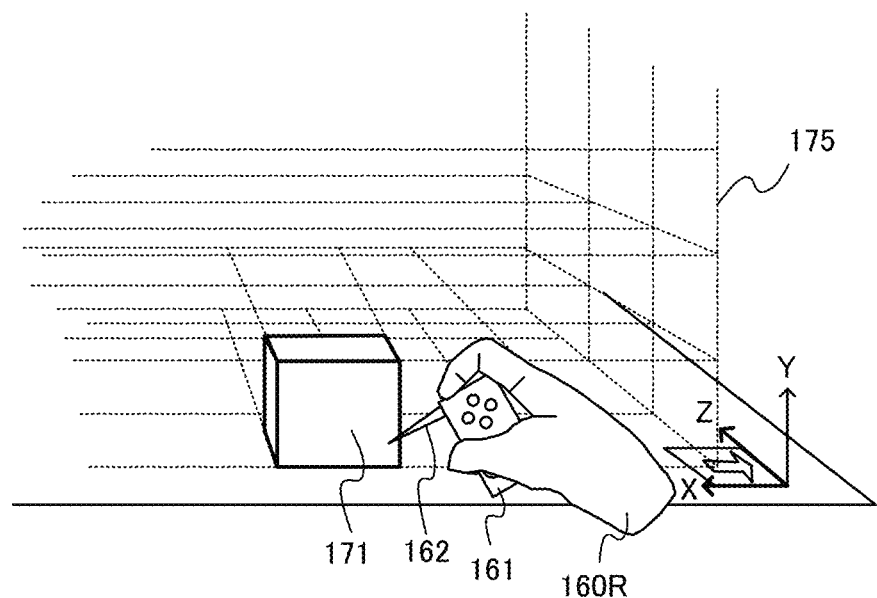
FIG. 20 is an example non-limiting diagram showing an example of a grid line for displaying a grid where each part object is placed.

To make it easy for the user to place a part object, a grid may be displayed in the virtual space. FIG. 20 is a diagram showing an example of a grid line for displaying a grid where each part object is placed. As shown in FIG. 20, when the virtual space is created, a grid line 175 may be displayed. The grid line 175 includes a line parallel to the X-axis, a line parallel to the Y-axis, and a line parallel to the Z-axis. In an area surrounded by the grid line 175, a single part object is placed. For example, if the end of the indication object 162 enters a single area surrounded by the grid line 175 in the state where the part object 171 is selected, the part object 171 is placed in the area. A part object may be placed in the state where the part object is floating (at a position away from the XZ plane) without another object below the part object.

The part object 171 is thus placed in each grid cube, whereby it is possible to easily arrange part objects in the virtual space without the user accurately specifying the positions of the part objects.

(Placement of Actual Object)

Figure 21:
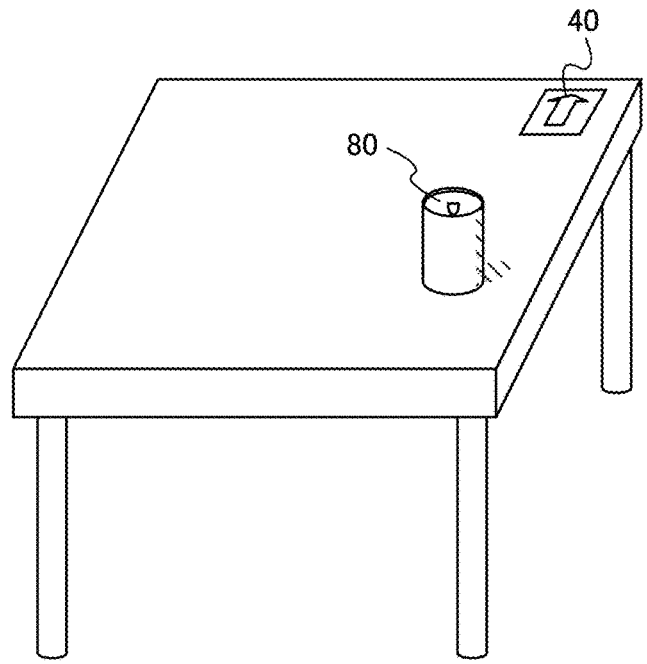
FIG. 21 is a diagram showing the state where a can 80 as an actual object is placed on a table in a real space.
Figure 22:
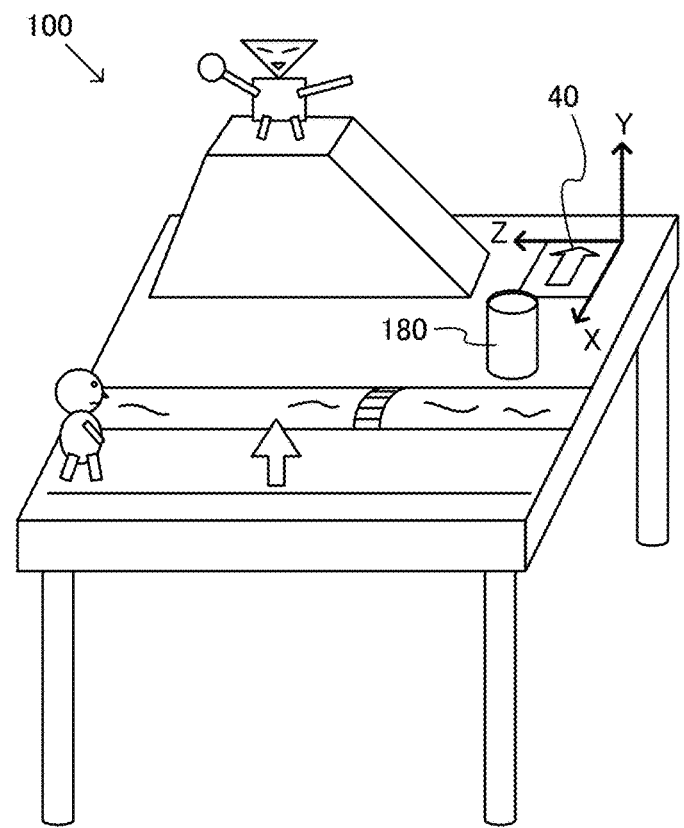
FIG. 22 is an example non-limiting diagram showing the state where a virtual object 180 relating to the can 80 is placed in the virtual space.

In the image processing system 1 according to the exemplary embodiment, it is possible to recognize an actual object in the real space and place a virtual object relating to the actual object in the virtual space. FIG. 21 is a diagram showing the state where a can 80 as an actual object is placed on the table in the real space. FIG. 22 is a diagram showing the state where a virtual object 180 relating to the can 80 is placed in the virtual space.

For example, if an image including the can 80 and the marker 40 is acquired from the camera 23 of the smart device 20, the smart device 20 detects the can 80 based on the image. The smart device 20 learns a plurality of actual objects in advance and can recognize an actual object based on the image acquired from the camera 23. For example, if the smart device 20a recognizes the can 80 from the acquired image, the can object 180 is placed at a position in the virtual space relating to the position of the can 80 in the real space. Information regarding the placement of the can object 180 and the position and the orientation of the can object 180 is transmitted to the information processing apparatus 60 and stored in the information processing apparatus 60. Consequently, the placement of the can object 180 in the virtual space and the position and the orientation of the can object 180 are shared by the devices of the image processing system 1.

After the can object 180 is placed in the virtual space, images of the virtual space including the can object 180 are acquired based on the virtual cameras. For example, on the displays 12 of the first HMD 10, an image of the virtual space including the can object 180 is displayed. Also on the displays 32 of the second HMD 30, an image of the virtual space including the can object 180 is displayed.

Also on the display 22 of the smart device 20, an image including the can object 180 is displayed in a superimposed manner on an image of the real space. Specifically, if the camera 23 of the smart device 20 captures an image including the can 80, and the can object 180 is placed in the virtual space, an image of the can object 180 is displayed in a superimposed manner on the image of the can 80 on the display 22 of the smart device 20. Thus, the second user views not an image of the can 80 as an actual object but an image of the can object 180 as a virtual object through the display 22 of the smart device 20.

On the display 22 of the smart device 20, not an image of the can object 180 but an image of the can 80 as an actual object captured by the camera 23 may be displayed. In this case, in the image of the can 80, an image of the virtual space is not superimposed on an image of the real space captured by the camera 23, and in another portion different from the image of the can 80 (e.g., an area portion of the ground object 141 or a character), an image of the virtual space is superimposed on an image of the real space captured by the camera 23.

For example, after the smart device 20a detects the can 80 in the real space and the can object 180 is placed in the virtual space, and if the can 80 comes out of the image capturing range of the camera 23 by changing the position or the direction of the smart device 20a, the can object 180 remains placed at this position. That is, after the can object 180 is placed in the virtual space, and even if the can 80 is not moved, and the can 80 ceases to be detected by the smart device 20a, the can object 180 continues to be present in the virtual space.

Specifically, if the smart device 20a detects the can 80 and the can object 180 is placed in the virtual space, the can 80 continues to be detected also after that. Information regarding the position and the orientation of the can 80 is transmitted to the information processing apparatus 60 in real time. If the can 80 is not moved, and the position or the direction of the smart device 20a is changed, the position of the can 80 in an image captured by the camera 23 of the smart device 20a changes, but the position of the can 80 based on the marker 40 does not change. Thus, the position of the can object 180 does not change. Even if the can 80 comes out of the image capturing range of the camera 23 due to a change in the position or the direction of the smart device 20a, but if a change in the position of the can 80 is not detected, the position of the can object 180 does not change.

Even if the can 80 comes out of the image capturing range of the camera 23 of the smart device 20a, but if the can 80 is included in the image capturing range of the camera 23 of the smart device 20b, the smart device 20b continues to detect the can 80. Alternatively, images may be captured by the cameras 33 of the second HMD 30, and the can 80 may be detected. As described above, for example, after the smart device 20a detects the can 80 and the can object 180 is placed, another device other than the smart device 20a also tracks the position of the can 80.

On the other hand, after the can object 180 is placed in the virtual space, and if the can 80 is moved and removed from the table, the smart device 20 ceases to detect the can 80, and the can object 180 is erased from the virtual space.

Specifically, if the can 80 moves, the smart device 20a or 20b continues to detect the can 80, and the position of the can object 180 is updated. Alternatively, images may be captured by the cameras 33 of the second HMD 30, and the can 80 may be detected. If the can 80 moves, the position of the can object 180 continues to be updated until the can 80 is removed from the table. If the position of the can object 180 goes beyond a predetermined range (e.g., moves to outside the table), the can object 180 is erased from the virtual space.

After the can object 180 is placed at a predetermined position in the virtual space, and if the can 80 comes out of the image capturing range of the camera 23 due to a change in the position or the direction of the smart device 20, the can object 180 continues to be present at the predetermined position. However, when a position in the real space relating to the above predetermined position (the position where the can 80 has been present before coming out of the image capturing range) enters the image capturing range of the camera 23 again by the position or the direction of the smart device 20 returning, and if the smart device 20 does not detect the can 80, the can object 180 is erased from the virtual space.

After the can object 180 is placed at a first position in the virtual space, and in a case where the image capturing range of the camera 23 changes due to a change in the position or the direction of the smart device 20 and the can 80 comes out of the image capturing range of the camera 23, and if the can 80 is detected in the changed image capturing range of the camera 23, the can object 180 may be placed at a second position in the virtual space relating to the newly detected position of the can 80, and the can object 180 at the first position may also be erased. In other words, in this case, the can object 180 may be instantaneously moved from the first position to the second position.

For example, after the can object 180 is placed at the first position in the virtual space, and in a case where the image capturing range of the camera 23 changes due to a change in the position or the direction of the smart device 20 and the can 80 comes out of the image capturing range of the camera 23, and if the can 80 is detected in the changed image capturing range of the camera 23, the can object 180 may be newly placed at the second position in the virtual space relating to the newly detected position of the can 80, and the can object 180 may also continue to be present at the first position. In this case, after a single can 80 is detected and the first can object 180 is placed in the virtual space, the same can 80 can be detected at another location and the second can object 180 can be placed in the virtual space.

A condition regarding the number of can objects 180 placed in the virtual space may be set, and in accordance with the condition, control may be performed to determine whether to erase the can object 180 at the first position or cause the can object 180 to also continue to be present at the first position if the can 80 is detected in the changed image capturing range of the camera 23. For example, it may be determined whether the number of can objects 180 placed in the virtual space is set to one or set to two or more, and control in accordance with the result of the determination may be performed. For example, in a case where the number of can objects 180 placed in the virtual space is set (limited) to one, and after the can object 180 is placed at the first position in the virtual space, and if the can 80 comes out of the image capturing range of the camera 23, and if the can 80 is detected in the changed image capturing range of the camera 23, the can object 180 may be placed at the second position in the virtual space relating to the detected position of the can 80, and the can object 180 at the first position may also be erased. In a case where the number of can objects 180 placed in the virtual space is set to (tolerates) two or more, and after the can object 180 is placed at the first position in the virtual space, and if the can 80 comes out of the image capturing range of the camera 23, and if the can 80 is detected in the changed image capturing range of the camera 23, the can object 180 may be placed at the second position in the virtual space relating to the detected position of the can 80, and the can object 180 may also continue to be present at the first position.

After the can 80 is recognized and the can object 180 is placed in the virtual space, and even if the can 80 is removed out of the table, the can object 180 may continue to be present in the virtual space. That is, after the can object 180 is placed in the virtual space, and even in a situation where the removal of the can 80 out of the table can be tracked by a camera, the can object 180 may continue to be present in the virtual space. Consequently, for example, after a first particular object is placed on the table, the first particular object is removed and a second particular object is placed on the table, whereby a first virtual object relating to the first particular object and a second virtual object relating to the second particular object can be placed in the virtual space.

The game is controlled using the can object 180 placed in the virtual space. For example, the can object 180 may be used to defend against the attack of the character 110. If the bullet object 112 from the character 110 hits the can object 180, the bullet object 112 may be erased. Alternatively, another change may be made in the virtual space using the can object 180. For example, if a user performs a predetermined operation on the can object 180, the state where liquid spurts from the can object 180 may be displayed.

As described above, in the image processing system 1 according to the exemplary embodiment, it is possible to cause a virtual object relating to a particular object in the real space to appear in the virtual space. Thus, it is possible to give the first user a feeling as if the real space and the virtual space were mixed together.

A description has been given above of an example where a particular object is captured by the camera 23 of the smart device 20. Alternatively, a particular object may be captured by another camera different from the camera 23 (e.g., a camera placed at a predetermined position in the real space or the cameras of the second HMD 30 or the first HMD 10). Then, based on an image from the camera, the information processing apparatus 60 or the smart device 20 detects a particular object. If the particular object is detected, a virtual object relating to the particular object may be placed in the virtual space.

(Data Stored in Each Device)

Figure 23:
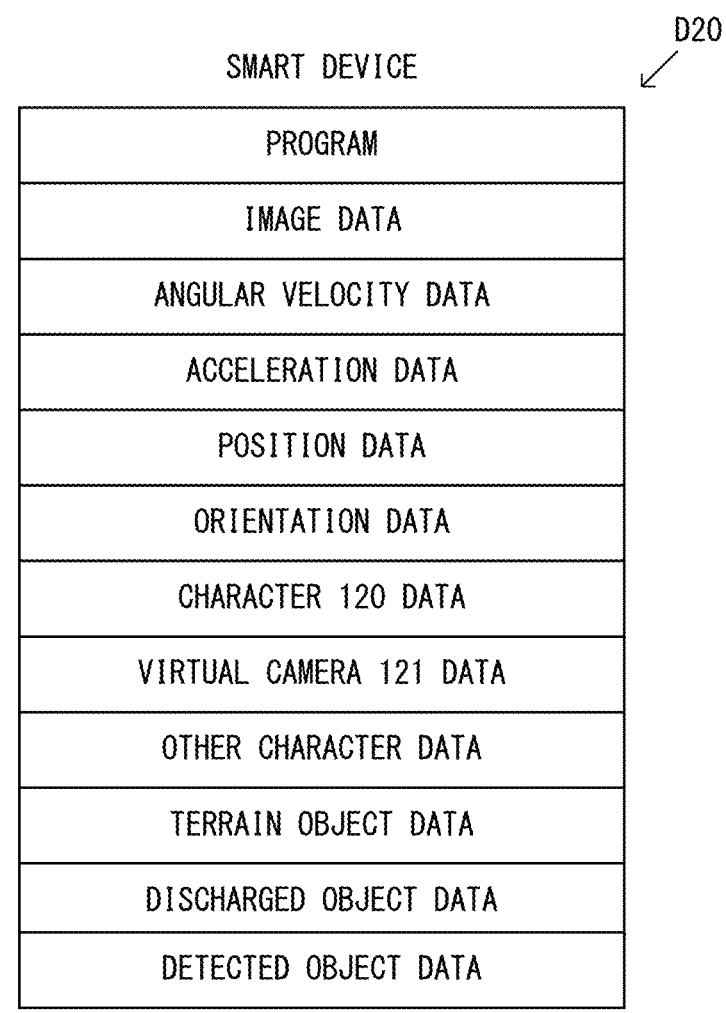
FIG. 23 is an example non-limiting diagram showing an example of data D20 stored in each smart device 20.

Next, data stored in each device is described. FIG. 23 is a diagram showing an example of data D20 stored in each smart device 20.

As shown in FIG. 23, the smart device 20 stores a program for performing a smart device process described below. The smart device 20 also stores image data acquired from the camera 23 and angular velocity data and acceleration data from the inertial sensor 24. The smart device 20 also stores position data indicating the position of the smart device 20 relative to the marker 40 calculated based on the image data. The smart device 20 also stores orientation data indicating orientation information regarding the smart device 20 calculated based on the angular velocity data and the acceleration data.

The smart device 20 also stores character 120 data regarding the character 120 relating to the user of the smart device 20, and virtual camera 121 data indicating the position and the orientation of the virtual camera 121. The character 120 data includes data indicating the position and the orientation in the virtual space of the character 120, data indicating the shape of the character 120, and data regarding a virtual object (e.g., the bullet object 122) owned by the character 120.

The smart device 20 also stores other character data, terrain object data, discharged object data, and detected object data.

The other character data is data regarding a character relating to the user of another device other than the smart device 20. The other character data is acquired from the information processing apparatus 60. For example, the smart device 20a stores data regarding the character 110, the character 120b, and the character 130 as the other character data. The other character data includes data indicating the position and the orientation of each character, and data regarding the shape of each character.

The terrain object data is data of the objects regarding terrains (141 to 145) for forming the virtual space and includes information regarding a plurality of part objects and the placement of the plurality of part objects. The terrain object data is acquired from the information processing apparatus 60. The terrain object data includes data created by a game creator and stored in the image processing system 1 in advance, and data created by the user and stored in the image processing system 1 as described above.

The discharged object data is data regarding the bullet object discharged to the virtual space and includes data regarding the position, the moving velocity, and the moving direction of the bullet object. The discharged object data includes data regarding the bullet object 122 discharged from the character 120 of the smart device 20, and data acquired from the information processing apparatus 60 and regarding a bullet object discharged from a character relating to another device.

The detected object data is data regarding a virtual object (e.g., the can object 180) placed in the virtual space in a case where a preset particular object (e.g., the can 80) is detected. The detected object data includes data regarding the shape of the virtual object and data regarding the position and the orientation of the virtual object.

Figure 24:
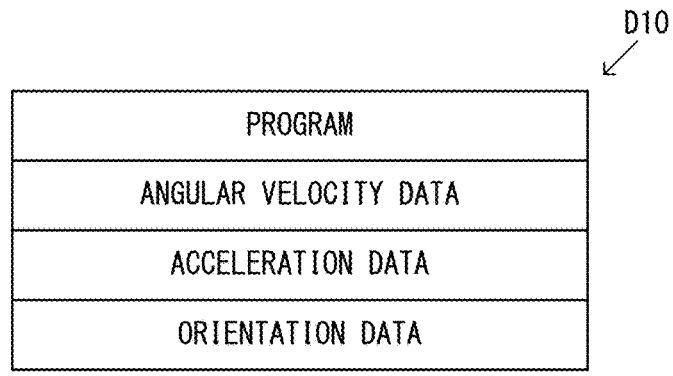
FIG. 24 is an example non-limiting diagram showing an example of data D10 stored in the first HMD 10.
Figure 25:
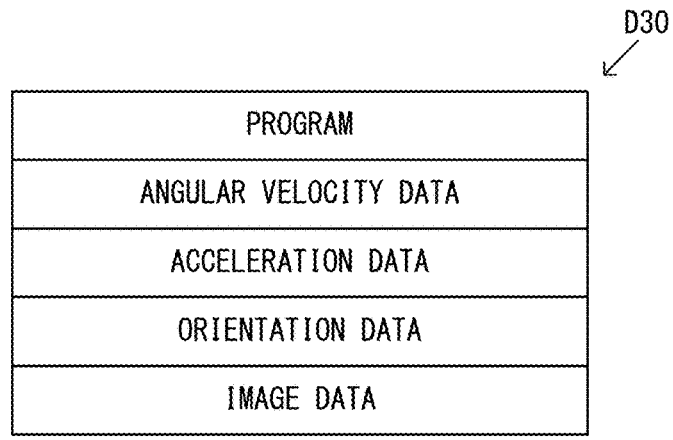
FIG. 25 is an example non-limiting diagram showing an example of data D30 stored in the second HMD 30.

FIG. 24 is a diagram showing an example of data D10 stored in the first HMD 10. FIG. 25 is a diagram showing an example of data D30 stored in the second HMD 30.

As shown in FIG. 24, the first HMD 10 stores a program for performing an HMD process described below, angular velocity data and acceleration data from the inertial sensor 15, and orientation data regarding orientation information regarding the first HMD 10 calculated from the angular velocity data and the acceleration data.

The second HMD 30 stores a program for performing the HMD process, angular velocity data and acceleration data from the inertial sensor 35, orientation data regarding orientation information regarding the second HMD 30 calculated from the angular velocity data and the acceleration data, and image data from the cameras 33.

Figure 26:
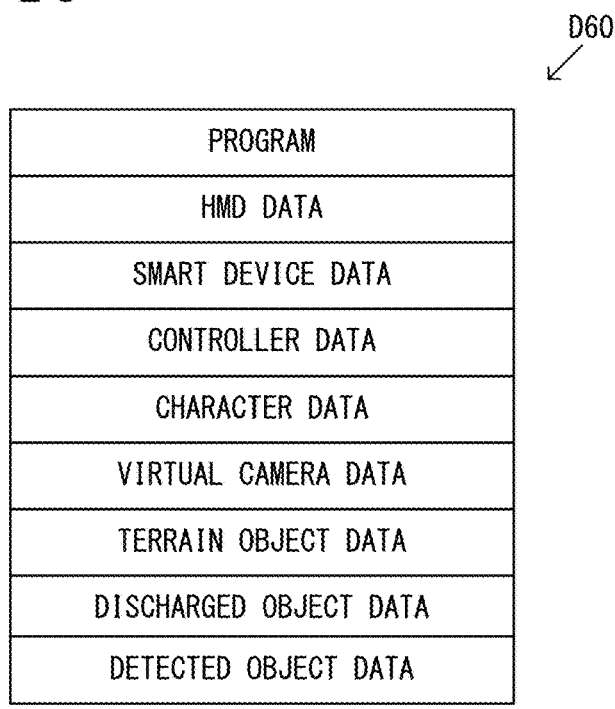
FIG. 26 is an example non-limiting diagram showing an example of data D60 stored in an information processing apparatus 60.

FIG. 26 is a diagram showing an example of data D60 stored in the information processing apparatus 60.

As shown in FIG. 26, the information processing apparatus 60 stores a program for performing a game control process described below, HMD data, smart device data, controller data, character data, and virtual camera data. The information processing apparatus 60 also stores the above terrain object data, discharged object data, and detected object data.

The HMD data is data regarding the first HMD 10 and the second HMD 30. Specifically, the HMD data includes the orientation data acquired from the first HMD 10. The HMD data also includes position data on the second HMD 30 calculated based on the image data from the second HMD 30, and the orientation data acquired from the second HMD 30.

The smart device data includes data indicating the position and the orientation of each smart device 20 acquired from the smart device 20, and data regarding an operation performed on the smart device 20.

The controller data is data regarding each controller (18 or 38). The controller data includes data regarding an operation performed on a button, the stick, the directional pad, or the like of the controller. The controller data also includes data regarding the orientation or the motion of the controller.

The character data is data regarding each character (110, 120, or 130) and includes data regarding the position or the orientation of the character. The virtual camera data is data regarding each virtual camera (111, 121, 131, or 150) and includes data regarding the position or the orientation of the virtual camera.

(Details of Process by HMD)

Figure 27:
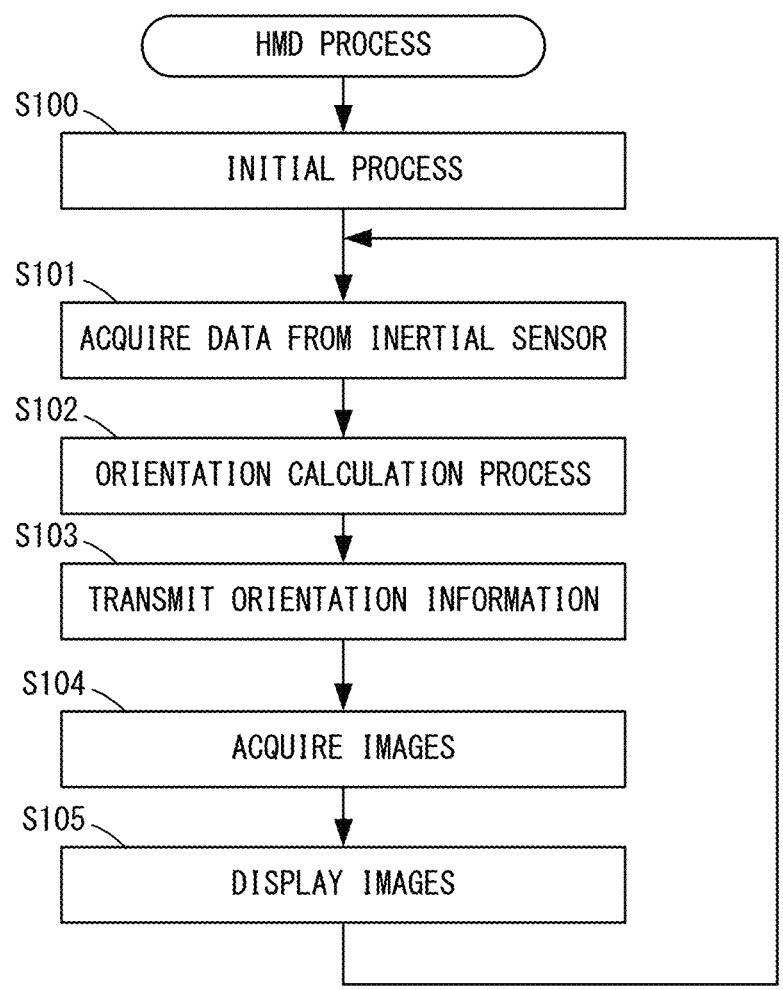
FIG. 27 is an example non-limiting flow chart showing an example of an HMD process executed by the first HMD 10 or the second HMD 30.

Next, the details of a process performed by each device are specifically described. FIG. 27 is a flow chart showing an example of an HMD process executed by the first HMD 10 or the second HMD 30. The process shown in FIG. 27 is started in accordance with an instruction to start the game in the image processing system 1. The following description is given on the assumption that (a processor 11 of) the first HMD 10 executes the process shown in FIG. 27. The second HMD 30 also performs a similar process.

As shown in FIG. 27, the first HMD 10 performs an initial process (step S100). In the initial process, the orientation of the first HMD 10 is initialized. After the first HMD 10 performs the initial process, the first HMD 10 repeatedly executes steps S101 to S105 at predetermined time intervals (e.g., ⅙₀-second intervals).

Next, the first HMD 10 acquires the angular velocity data and the acceleration data detected by the inertial sensor 15 (step S101). Based on the acquired angular velocity data and acceleration data, the first HMD 10 calculates orientation information regarding the first HMD 10 (step S102). Specifically, the first HMD 10 calculates a change in the orientation from the time when the initial process is performed. Next, the first HMD 10 transmits the calculated orientation information to the information processing apparatus 60 (step S103).

Next, the first HMD 10 acquires a left-eye virtual space image to be displayed on the left-eye display 12L and a right-eye virtual space image to be displayed on the right-eye display 12R from the information processing apparatus 60 (step S104). Then, the first HMD 10 displays the acquired left-eye virtual space image and right-eye virtual space image on the left-eye display 12L and the right-eye display 12R, respectively (step S105).

The second HMD 30 performs the process of acquiring images captured by the cameras 33 and a process for transmitting the acquired images to the information processing apparatus 60 in addition to the above process.

(Details of Process by Smart Device)

Figure 28:
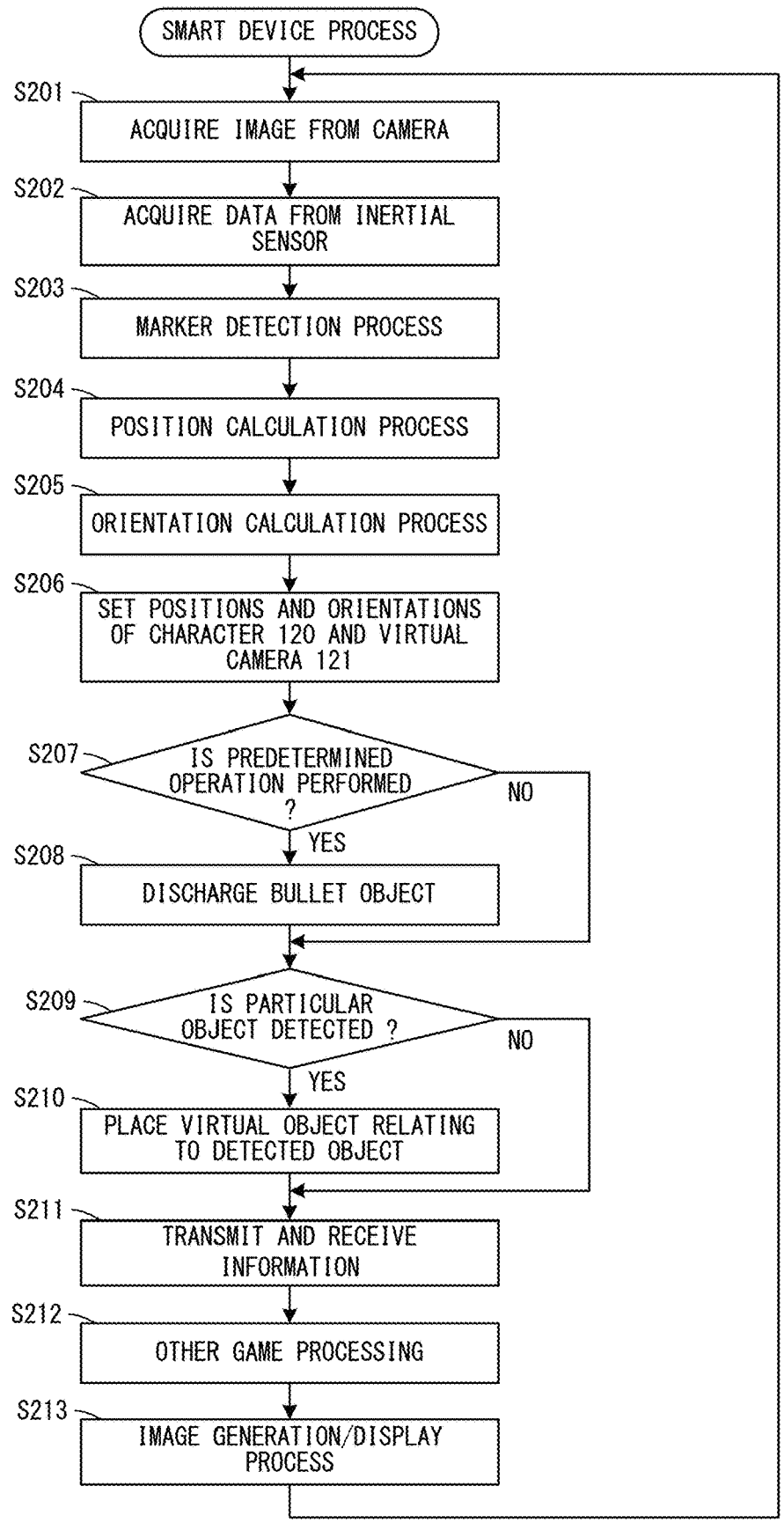
FIG. 28 is an example non-limiting flow chart showing an example of a smart device process executed by the smart device 20.

Next, a process executed by each smart device 20 is described. FIG. 28 is a flow chart showing an example of a smart device process executed by the smart device 20. The process shown in FIG. 28 is performed by a processor 21 of the smart device 20. Before the process shown in FIG. 28 is started, the user gives an instruction to start the game, and necessary data (e.g., the terrain object data and the other character data) is acquired from the information processing apparatus 60.

As shown in FIG. 28, the smart device 20 acquires an image from the camera 23 (step S201), and acquires the angular velocity data and the acceleration data from the inertial sensor 24 (step S202).

Next, the smart device 20 performs a marker detection process (step S203). Specifically, the smart device 20 detects the marker 40 in the image acquired in step S201. If the smart device 20 does not detect the marker 40, the smart device 20 repeatedly executes the processes of steps S201 to S203.

If the smart device 20 detects the marker 40, the smart device 20 performs a position calculation process (step S204). Specifically, the smart device 20 sets an XYZ coordinate system based on the detected marker 40 and calculates the position (XYZ coordinate values) of the smart device 20 relative to the marker 40. Specifically, based on the size of an image of the marker 40, the direction of the arrow, or the like, the smart device 20 calculates the distance from the marker 40 to the smart device 20 and the direction from the marker 40 to the smart device 20 and calculates the relative position of the smart device 20 based on the marker 40.

Next, the smart device 20 performs an orientation calculation process (step S205). Specifically, based on the angular velocity data and the acceleration data acquired in step S202, the smart device 20 calculates the orientation of the smart device 20. Based on the image from the camera 23 (the detection result of the marker 40), the smart device 20 may calculate the orientation. Based on the image from the camera 23 and the angular velocity data and the acceleration data from the inertial sensor 24, the smart device 20 may calculate the orientation.

Next, based on the position calculated in step S204 and the orientation calculated in step S205, the smart device 20 sets the position and the orientation of the character 120 (step S206). Based on the position calculated in step S204 and the orientation calculated in step S205, the smart device 20 sets the position and the orientation of the virtual camera 121. For example, the smart device 20 sets the positions of the character 120 and the virtual camera 121 to match the position calculated in step S204. The smart device 20 sets the orientations of the character 120 and the virtual camera 121 to match the orientation calculated in step S205. The position and the orientation of the virtual camera 121 may not necessarily match the position and the orientation of the character 120. For example, the position of the virtual camera 121 may be set at a predetermined position behind the character 120.

Next, the smart device 20 determines whether or not a predetermined operation is performed on an operation section (step S207). For example, the smart device 20 determines whether or not a swipe operation for discharging the bullet object 122 is performed on the touch panel.

If the predetermined operation is performed (step S207: YES), the smart device 20 discharges the bullet object 122 to the virtual space (step S208). Consequently, the state where the bullet object 122 is discharged into the virtual space and the bullet object 122 moves is displayed.

If the process of step S208 is executed, or if the determination is NO in step S207, the smart device 20 determines whether or not a preset particular object is detected in the image acquired in step S201 (step S209). The smart device 20 learns a plurality of particular objects in advance and determines whether or not there is a particular object in the acquired image.

If the particular object is detected (step S209: YES), the smart device 20 places a virtual object relating to the detected particular object in the virtual space (step S210). Specifically, based on the positional relationship between the marker 40 and the particular object, the smart device 20 calculates the position of the particular object and places the virtual object relating to the detected particular object at the same position in the virtual space as the calculated position. For example, if the can 80 is detected as the particular object, the smart device 20 places the can object 180 in the virtual space.

If the process of step S210 is executed, or if the determination is NO in step S209, the smart device 20 transmits and receives information to and from the information processing apparatus 60 (step S211). Specifically, the smart device 20 transmits the position calculated in step S204 and the orientation calculated in step S205 to the information processing apparatus 60. The smart device 20 also transmits information regarding the positions and the orientations of the character 120 and the virtual camera 121 set in step S206 to the information processing apparatus 60. If the smart device 20 discharges the bullet object 122 into the virtual space in step S208, the smart device 20 transmits data regarding the discharge direction, the discharge velocity, or the like of the bullet object 122 as the discharged object data to the information processing apparatus 60. If the smart device 20 places the virtual object relating to the particular object in step S210, the smart device 20 transmits data regarding the placed virtual object (the type, the position, and the orientation of the virtual object) as the detected object data to the information processing apparatus 60.

In step S211, the smart device 20 also receives the other character data from the information processing apparatus 60. Specifically, the smart device 20 receives information regarding the positions and the orientations of the character 110 relating to the first HMD 10, the character 120 relating to another smart device 20, and the character 130 relating to the second HMD 30 as the other character data. Consequently, the smart device 20 updates the other character data stored in the smart device 20. The smart device 20 also receives from the information processing apparatus 60 the discharged object data regarding a discharged object discharged in accordance with an operation on another device, and the detected object data regarding a virtual object relating to a particular object detected by another device.

After step S211, the smart device 20 performs other game processing (step S212). Here, the smart device 20 performs game processing in accordance with the positions of each character and a discharged object. For example, the smart device 20 determines whether or not the discharged object 112 hits the character 130. If the discharged object 112 hits the character 130, the smart device 20 decreases the physical strength value of the character 130.

Next, the smart device 20 performs an image generation/display process (step S213). Specifically, first, the smart device 20 generates an image of the virtual space based on the virtual camera 121. Consequently, an image of the virtual space viewed from the virtual camera 121 is generated. For example, if the character 110 and the character 130 are included in the image capturing range of the virtual camera 121, an image of the virtual space including the character 110 and the character 130 is generated. The smart device 20 generates a superimposed image obtained by superimposing the generated image of the virtual space on the image of the real space acquired in step S201. Then, the smart device 20 displays the generated superimposed image on the display 22.

After the process of step S213, the smart device 20 returns to the process of step S201. The processes of steps S201 to S213 are repeatedly performed at predetermined time intervals (e.g., $\frac{1}{60}$-second intervals), whereby the game progresses.

(Details of Process by Information Processing Apparatus)

Figure 29:
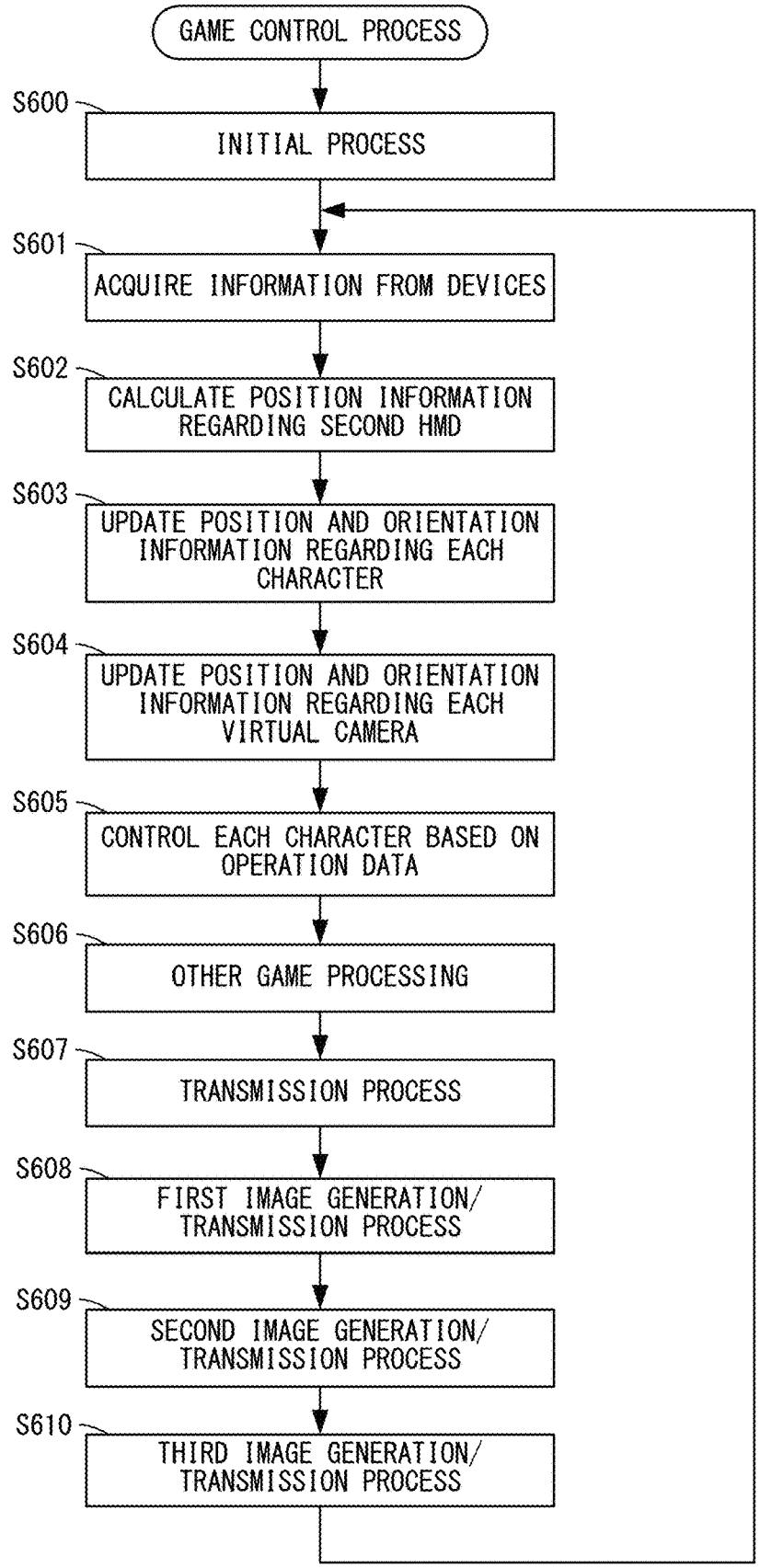
FIG. 29 is an example non-limiting flow chart showing an example of a game control process executed by the information processing apparatus 60.

FIG. 29 is a flow chart showing an example of a game control process executed by the information processing apparatus 60. The process shown in FIG. 29 is performed by a processor 61 of the information processing apparatus 60.

As shown in FIG. 29, first, in accordance with an instruction to start the game, the information processing apparatus 60 performs an initial process (step S600). In the initial process, the various objects regarding terrains (141 to 145) are placed in the virtual space, the character 110 is placed at the top of the hill object 145, and the character 130 is placed at an initial position. The virtual cameras relating to the characters are placed.

Next, the information processing apparatus 60 acquires information from the devices (step S601). Specifically, the information processing apparatus 60 acquires orientation information regarding the first HMD 10 transmitted from the first HMD 10. The information processing apparatus 60 also acquires orientation information regarding the second HMD 30 transmitted from the second HMD 30 and images captured by the cameras 33. The information processing apparatus 60 also acquires position information and orientation information calculated by each smart device 20. If the bullet object 122 is discharged by the smart device 20 (if the above step S208 is executed), the information processing apparatus 60 also receives the discharged object data from the smart device 20. If a particular object is detected and a virtual object relating to the particular object is placed by the smart device 20 (if the above step S210 is executed), the information processing apparatus 60 also acquires the detected object data from the smart device 20.

In step S601, the information processing apparatus 60 also acquires operation data relating to an operation on the controller 18 or 38. The operation data includes data indicating whether or not a button is pressed, data relating to an operation on the analog stick, data relating to an operation on the directional pad, and the angular velocity data and the acceleration data from the inertial sensor.

Next, the information processing apparatus 60 calculates position information regarding the second HMD 30 (step S602). Specifically, based on images from the second HMD 30 acquired in step S601, the information processing apparatus 60 detects the marker 40, and based on the detection result of the marker 40, calculates the position of the second HMD 30 relative to the marker 40. The information processing apparatus 60 may calculate orientation information regarding the second HMD 30 based on the images from the second HMD 30 in addition to the position information regarding the second HMD 30.

Next, the information processing apparatus 60 updates position information and orientation information regarding each character (step S603). Specifically, in accordance with the position information and the orientation information acquired from each smart device 20 in step S601, the information processing apparatus 60 updates position information and orientation information regarding the character 120 relating to the smart device 20. In accordance with the orientation information acquired from the first HMD 10 in step S601, the information processing apparatus 60 also updates orientation information regarding the character 110. Based on the operation data acquired from the controller 38 in step S601, the information processing apparatus 60 also moves the character 130 in the virtual space and updates position information regarding the character 130.

Next, the information processing apparatus 60 updates position information and orientation information regarding each virtual camera (step S604). Specifically, in accordance with the position information and the orientation information acquired from each smart device 20 in step S601, the information processing apparatus 60 updates position information and orientation information regarding each virtual camera 121. For example, the information processing apparatus 60 sets the position and the orientation of the virtual camera 121 to match the position and the orientation of the character 120. In accordance with the orientation information acquired from the first HMD 10 in step S601, the information processing apparatus 60 also updates orientation information regarding the virtual camera 111. If the virtual camera 131 is set to the first mode, the information processing apparatus 60 also updates position information and orientation information regarding the virtual camera 131 in accordance with the position information and the orientation information regarding the second HMD 30.

If the virtual camera 131 is set to the second mode, the position information and the orientation information regarding the virtual camera 131 are set in accordance with the position information and orientation information regarding the character 130. For example, the position and the orientation of the virtual camera 131 are set to match the position and the orientation of the character 130.

After step S604, the information processing apparatus 60 controls each character based on operation data (step S605). For example, based on operation data from the smart device 20, the information processing apparatus 60 causes the character 120 to discharge the bullet object 122. Based on operation data from the controller 18, the information processing apparatus 60 also causes the character 110 to discharge the bullet object 112. Based on operation data from the controller 38, the information processing apparatus 60 also causes the character 130 to perform a predetermined action (e.g., attack the character 110).

Next, the information processing apparatus 60 performs other game processing (step S606). For example, if the bullet object 112 is moving, the information processing apparatus 60 moves the bullet object 112 in the virtual space and determines whether or not the bullet object 112 hits the character 130. If the bullet object 112 hits the character 130, the information processing apparatus 60 decreases the physical strength value of the character 130. If the bullet object 122 hits the character 110, the information processing apparatus 60 decreases the physical strength value of the character 110.

Next, the information processing apparatus 60 performs a transmission process (step S607). Specifically, the information processing apparatus 60 transmits the results of the processes of steps S603, S605, and S606 to each smart device 20. Consequently, the position information and the orientation information regarding each character (110, 120, and 130) are transmitted to the smart device 20. Information regarding the fact that the character discharges the bullet object and the discharge direction and the discharge velocity of the bullet object are transmitted to the smart device 20.

After step S607, the information processing apparatus 60 performs a first image generation/transmission process to display images on the displays 12 of the first HMD 10 (step S608). Specifically, the information processing apparatus 60 generates a left-eye virtual space image based on the left virtual camera 111L and also generates a right-eye virtual space image based on the right virtual camera 111R. Then, the information processing apparatus 60 transmits the generated left-eye virtual space image and right-eye virtual space image to the first HMD 10. Consequently, the left-eye virtual space image and the right-eye virtual space image based on the virtual camera 111 are displayed on the left-eye display 12L and the right-eye display 12R, respectively, of the first HMD 10.

Next, the information processing apparatus 60 performs a second image generation/transmission process to display images on the displays 32 of the second HMD 30 (step S609). Specifically, the information processing apparatus 60 generates a left-eye virtual space image based on the left virtual camera 131L and also generates a right-eye virtual space image based on the right virtual camera 131R. Then, the information processing apparatus 60 transmits the generated left-eye virtual space image and right-eye virtual space image to the second HMD 30. Consequently, the left-eye virtual space image and the right-eye virtual space image based on the virtual camera 131 are displayed on the left-eye display 32L and the right-eye display 32R, respectively, of the second HMD 30.

Next, the information processing apparatus 60 performs a third image generation/transmission process to display an image on the display 50 (step S610). Specifically, the information processing apparatus 60 generates a virtual space image based on the virtual camera 150 and outputs the generated image to the display 50. Consequently, the image based on the virtual camera 150 is displayed on the display 50.

As described above, in the exemplary embodiment, the character 110 is placed in the virtual space, regardless of the position in the real space of the first HMD 10. The virtual camera 111 is placed at a position relating to the position of the character 110 (S600). The virtual camera 121 is placed at a position in the virtual space relating to the position of the smart device 20 relative to the marker 40 in the real space, and the orientation of the virtual camera 121 is set in accordance with the orientation of the smart device 20 (S604). The character 120 is set at a position in the virtual space relating to the position of the smart device 20 relative to the marker 40. Then, an image of the virtual space including the character 120 viewed from the virtual camera 111 is displayed on the displays 12 of the first HMD 10. An image of the virtual space including the character 110 viewed from the virtual camera 121 is displayed on the display 22 of the smart device 20.

Consequently, the first user can perform the game while viewing the virtual space from the point of view of the character 110 using the first HMD 10 and have an experience as if the first user were present in the virtual space. The second user can view the same virtual space using the smart device 20 and have a feeling as if virtual objects in the virtual space were present in the real space.

(Variations)

While image processing according to the exemplary embodiment has been described above, the exemplary embodiment is merely an example and can be modified as follows, for example.

For example, in the above exemplary embodiment, the first user wears the first HMD 10 on their head and views images displayed on the left and right displays 12 of the first HMD 10. In another exemplary embodiment, the displays 12 viewed by the first user are not limited to a head-mounted display, and may be a portable display (e.g., a smartphone, a tablet terminal, a mobile game apparatus, a mobile personal computer, or the like) held by hand, or may be a stationary display (e.g., a television or a display of a stationary personal computer).

In the above exemplary embodiment, the second user holds the portable smart device 20 and views an image displayed on the display 22 of the smart device 20. In another exemplary embodiment, as such a mobile apparatus, the portable display 22 viewed by the second user may be a smartphone, a display of a game apparatus, a head-mounted display, or an eyeglass-type apparatus including a transmissive display.

In the above exemplary embodiment, the character 110 is fixed to a predetermined position in the virtual space, the direction of the character 110 is controlled in accordance with the orientation of the first HMD 10, and the character 110 is caused to perform a predetermined action (the action of throwing the bullet object 112) in accordance with a swing operation on the controller 18. In another exemplary embodiment, in accordance with an operation on the controller 18 (a key input to the controller 18 (an input to a button, the analog stick, or the directional pad), the swing operation on the controller 18, or the like), the position or the orientation of the character 110 may be controlled, or the character 110 may be caused to perform the predetermined action. In accordance with an operation on the first HMD 10, the position of the character 110 may be controlled, or the character 110 may be caused to perform the predetermined action. That is, the character 110 may be controlled in the virtual space in accordance with an input to any input device including the first HMD 10 and the controller 18 (the inertial sensor of the first HMD 10, a key or the inertial sensor of the controller 18, or another input device different from the first HMD 10 and the controller 18). The "control of the character 110" as used herein includes a change in the position of the character 110, a change in the orientation of the character 110, the predetermined action of the character 110, and the like.

In the above exemplary embodiment, the position or the direction of the character 130 is controlled in accordance with a key input to the controller 38. In another exemplary embodiment, the character 130 may be controlled in accordance with an operation on the controller 18 (a key input to the controller 38, a swing operation on the controller 38, or the like). In another exemplary embodiment, the character 130 may be controlled in accordance with an input to any input device. For example, the position of the character 130 may be controlled in accordance with an operation on the controller 38, and the direction of the character 130 may be controlled in accordance with the orientation of the second HMD 30.

In the above exemplary embodiment, the character 120 is caused to perform a predetermined action (e.g., the action of throwing the bullet object 122) in accordance with an input to the smart device 20. In another exemplary embodiment, the character 120 may be controlled in accordance with an input to any input device including the smart device 20 (the touch panel, a button, or the inertial sensor of the smart device 20, or another input device separate from the smart device 20).

In the above exemplary embodiment, the position of the smart device 20 relative to the marker 40 is calculated based on an image captured by the camera 23 of the smart device 20. In another exemplary embodiment, the position of the smart device 20 relative to the marker 40 may be calculated by another method. For example, the position of the smart device 20 relative to the marker 40 may be calculated by capturing the marker 40 and the smart device 20 using a camera placed at a position in the real space different from that of the smart device 20. As described with reference to FIG. 9, the position of the smart device 20 in the real space may be calculated using the sensor bars 55.

In the above exemplary embodiment, the position of the smart device 20 relative to the marker 40 is calculated. In another exemplary embodiment, the position of the smart device 20 relative to not only the marker 40 but also a predetermined reference in the real space may be calculated. Here, the predetermined reference may be the marker 40, the sensor bars 55, another object, or a predetermined place. "The position of the smart device 20 relative to the predetermined reference" may be represented by coordinate values.

In the above exemplary embodiment, the orientation of the first HMD 10 is calculated based on data from the inertial sensor 15 of the first HMD 10. In another exemplary embodiment, the orientation of the first HMD 10 may be calculated by another method. For example, the first HMD 10 may be captured by a camera, and based on the image from the camera, the orientation of the first HMD 10 may be calculated. The same applies to the second HMD 30. The orientation of the smart device 20 may also be calculated based on an image from a camera.

The processes shown in the above flow charts are merely illustrative, and the order, the contents, and the like of the processes may be appropriately changed. The processes in the above flow charts may be executed by any device among the first HMD 10, the smart device 20, the second HMD 30, and the information processing apparatus 60.

For example, in the above exemplary embodiment, the first HMD 10 calculates the orientation of the first HMD 10 based on sensor data from the inertial sensor included in the first HMD 10 and transmits the calculated orientation information to the information processing apparatus 60. In another exemplary embodiment, the information processing apparatus 60 may acquire sensor data from the first HMD 10 and calculate the orientation of the first HMD 10. In the above exemplary embodiment, the first HMD 10 calculates only the orientation of the first HMD 10, and the information processing apparatus 60 performs a substantial process regarding the game (the setting of the orientation of the character 110, the setting of the orientation of the virtual camera 111, and the generation of images). In another exemplary embodiment, the first HMD 10 may set the orientations of the character 110 and the virtual camera 111 and generate images. The same applies to the second HMD 30. Some or all of the processes performed by the smart device 20 (e.g., S204 to S206, S207 and S208, S209 and S210, S211, S212, and S213) may be performed by the information processing apparatus 60. Some or all of the above processes performed by the information processing apparatus 60 may be executed by another apparatus. For example, all the processes of the information processing apparatus 60 may be executed by the smart device 20.

The information processing apparatus 60 may include one or more apparatuses. The information processing apparatus 60 may include a plurality of apparatuses connected to a network (e.g., the Internet).

In the above exemplary embodiment, the first HMD 10, the smart device 20, the second HMD 30, and the display 50 are located at a single local location. In another exemplary embodiment, these apparatuses may be located at remote locations and connected together via a network. For example, the first HMD 10, the smart device 20, the second HMD 30, and the information processing apparatus 60 may be connected together via the Internet.

In the above exemplary embodiment, two images having parallax are generated based on left and right virtual cameras. In another exemplary embodiment, an image may be generated based on a single virtual camera, and two images having parallax may be generated by deforming the generated image.

In the above exemplary embodiment, as each of the first HMD 10 and the second HMD 30, a head-mounted display fixedly attached to the head of the user is used. In another exemplary embodiment, as each of the first HMD 10 or the second HMD 30, an apparatus may be used in which the user looks into left and right displays while keeping holding the apparatus by hand.

The configurations of the above exemplary embodiment and its variations can be optionally combined together unless they contradict each other. Further, the above description is merely an example of the exemplary embodiment, and may be improved and modified in various manners other than the above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An image processing system comprising:
a first display that can be viewed by a first user;
a first input device configured to receive an input from the first user;
a portable second display that is carried by a second user and can be viewed by the second user; and
at least one processor,
the at least one processor configured to:
  place a first object in a virtual space, regardless of positions in a real space of the first display and the first user;
  control the first object in accordance with the input received by the first input device;
  place a first virtual camera at a position relating to a position of the first object in the virtual space;
  place a second virtual camera at a first position in the virtual space set in accordance with a position of the second display relative to a reference in the real space and set an orientation of the second virtual camera to a first orientation relating to an orientation of the second display in the real space;
  place a second object at a second position in the virtual space set in accordance with the position of the second display relative to the reference in the real space;
  display an image of the virtual space including the second object on the first display, the image generated based on the first virtual camera; and
  display an image of the virtual space including the first object on the second display, the image generated based on the second virtual camera.

2. The image processing system according to claim 1, further comprising a second input device configured to receive an input from the second user, wherein
the at least one processor is configured to influence the virtual space or the first object in accordance with the input received by the second input device.

3. The image processing system according to claim 2, wherein
in accordance with the input received by the second input device, a third object appears in the virtual space,
an image including the second object and the third object is displayed on the first display, and
an image including the first object and the third object is displayed on the second display.

4. The image processing system according to claim 3, wherein
the first object is changed using the third object.

5. The image processing system according to claim 3, wherein
the at least one processor is configured to control a game using the first object, and
the third object is an object advantageous or disadvantageous in the game for the first object.

6. The image processing system according to claim 1, wherein
the first display is a head-mounted display,
the second display includes a camera configured to capture the real space in a back surface direction,
the at least one processor detects a marker placed in the real space as the reference based on an image from the camera and places the second virtual camera at the first position relating to a position of the second display relative to the marker, and
the at least one processor displays on the second display an image obtained by superimposing the image of the virtual space generated based on the second virtual camera on an image of the real space captured by the camera.

7. The image processing system according to claim 1, further comprising a controller held by the first user or the second user, wherein
the first display or the second display is a head-mounted display,
the image processing system further comprises a camera capable of capturing a hand of the first user or the second user wearing the head-mounted display, and
the at least one processor is configured to:
detect the hand of the first user or the second user or the controller based on an input image from the camera, place a virtual controller object representing the controller at a position of the hand, and further place, at a predetermined position in the controller object, an indication object for indicating a position in the virtual space; and
display an image including the controller object and the indication object on the head-mounted display.

8. The image processing system according to claim 1, further comprising a camera configured to capture the real space, wherein
the at least one processor is configured to:
detect a particular object present in the real space based on an input image from the camera and place a virtual object relating to the particular object at a position in the virtual space relating to at a position of the particular object in the real space; and
display an image of the virtual space including the virtual object on the first display.

9. The image processing system according to claim 8, wherein
the image of the virtual space including the virtual object is displayed on the second display.

10. The image processing system according to claim 8, wherein
the at least one processor:
after the virtual object is placed due to detection of the particular object, and if the particular object is not detected based on the input image from the camera, causes the virtual object to continue to be present in the virtual space; and
even if the particular object is not detected based on the input image from the camera, displays the image of the virtual space including the virtual object on the first display.

11. The image processing system according to claim 1, wherein
the first display is a head-mounted display, and
the at least one processor is configured to:
determine whether or not the first user comes out of a range in the real space, and if it is determined that the first user comes out of the range, give a notification to the first user; and
determine whether or not the second user enters the range, and if it is determined that the second user enters the range, give a notification to the second user.

12. The image processing system according to claim 1, wherein
the first input device is a controller to which a key input can be provided, and
the at least one processor controls the position or an orientation of the first object in accordance with the key input to the first input device.

13. The image processing system according to claim 1, wherein
the first virtual camera is placed at the position of the first object.

14. The image processing system according to claim 1, wherein
the first virtual camera is placed to include the first object in an image capturing range of the first virtual camera at a position a distance away from the position of the first object.

15. A non-transitory computer-readable storage medium having stored therein an image processing program executed by a computer of an image processing system including a first display that can be viewed by a first user and a portable second display that is carried by a second user and can be viewed by the second user, the image processing program causing the computer to:
place a first object in a virtual space, regardless of positions in a real space of the first display and the first user;
control the first object in accordance with an input from the first user;
place a first virtual camera at a position relating to a position of the first object in the virtual space;
place a second virtual camera at a first position in the virtual space set in accordance with a position of the second display relative to a reference in the real space and set an orientation of the second virtual camera to a first orientation relating to an orientation of the second display in the real space;
place a second object at a second position in the virtual space set in accordance with the position of the second display relative to the reference in the real space;
display an image of the virtual space including the second object on the first display, the image generated based on the first virtual camera; and
display an image of the virtual space including the first object on the second display, the image generated based on the second virtual camera.

16. An image processing method performed by an image processing system including a first display that can be viewed by a first user and a portable second display that is carried by a second user and can be viewed by the second user, the image processing method comprising:
placing a first object in a virtual space, regardless of positions in a real space of the first display and the first user;
controlling the first object in accordance with an input from the first user;
placing a first virtual camera at a position relating to a position of the first object in the virtual space;
placing a second virtual camera at a first position in the virtual space set in accordance with a position of the second display relative to a reference in the real space and setting an orientation of the second virtual camera to a first orientation relating to an orientation of the second display in the real space;
placing a second object at a second position in the virtual space set in accordance with the position of the second display relative to the reference in the real space;
displaying an image of the virtual space including the second object on the first display, the image generated based on the first virtual camera; and
displaying an image of the virtual space including the first object on the second display, the image generated based on the second virtual camera.

* * * * *